United States Patent
Kaneko et al.

(10) Patent No.: US 7,442,459 B2
(45) Date of Patent: Oct. 28, 2008

(54) SOLID ELECTROLYTE, MEMBRANE AND ELECTRODE ASSEMBLY, AND FUEL CELL

(75) Inventors: Masashi Kaneko, Minami-ashigara (JP); Kimiatsu Nomura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 11/433,286

(22) Filed: May 12, 2006

(65) Prior Publication Data

US 2006/0280983 A1 Dec. 14, 2006

(30) Foreign Application Priority Data

May 13, 2005 (JP) ............... 2005-141503
Jan. 25, 2006 (JP) ............... 2006-015972

(51) Int. Cl.
H01M 8/10 (2006.01)
H01M 8/08 (2006.01)
B01J 49/00 (2006.01)

(52) U.S. Cl. ............... 429/33; 429/46; 512/25

(58) Field of Classification Search .......... 429/33, 429/314; 525/23
See application file for complete search history.

(56) References Cited

U.S. PATENT DOCUMENTS

| | | | |
|---|---|---|---|
| 4,652,502 A * | 3/1987 | Breault et al. ............. | 429/13 |
| 4,730,904 A | 3/1988 | Pauluth et al. | |
| 4,835,076 A | 5/1989 | Heinze et al. | |
| 5,174,867 A | 12/1992 | Naarmann et al. | |
| 5,243,004 A | 9/1993 | Funatsu et al. | |
| 5,707,755 A * | 1/1998 | Grot ........................... | 429/40 |
| 5,843,519 A * | 12/1998 | Tada ........................... | 427/115 |
| 5,985,477 A * | 11/1999 | Iwasaki et al. ............... | 429/33 |
| 2004/0180250 A1 | 9/2004 | Masaaki et al. | |
| 2004/0241522 A1 | 12/2004 | Ono et al. | |
| 2005/0100772 A1 | 5/2005 | Ono | |
| 2005/0164063 A1 | 7/2005 | Wariishi et al. | |
| 2006/0008691 A1 | 1/2006 | Wariishi | |
| 2006/0014066 A1* | 1/2006 | Nishimoto et al. ............. | 429/33 |

FOREIGN PATENT DOCUMENTS

| | | |
|---|---|---|
| CA | 2 431 055 | 6/2002 |
| EP | 0 932 213 A1 | 7/1999 |
| EP | 1 085 038 A1 | 3/2001 |
| EP | 1 113 517 A2 | 4/2001 |
| EP | 1 274 147 A2 | 1/2003 |
| EP | 1 394 879 A1 | 3/2004 |
| JP | 09 245818 A | 9/1997 |
| JP | 2000 90946 | 3/2000 |
| JP | 2003 055337 | 2/2003 |
| WO | WO 00/15691 A | 3/2000 |
| WO | WO 02/25764 A | 3/2002 |
| WO | WO 03/099881 * | 4/2003 |
| WO | WO 03/073543 A2 | 9/2003 |

OTHER PUBLICATIONS

Wade, L.G. "Organic Chemistry" 2003 Prentice Hall. pp. 227 and 733.*

(Continued)

*Primary Examiner*—Dah-Wei Yuan
*Assistant Examiner*—Alexander Chuang
(74) *Attorney, Agent, or Firm*—Sughrue Mion, PLLC

(57) ABSTRACT

A solid electrolyte having an aromatic ring in a main chain, wherein a sulfuric acid group bonds to the aromatic ring via a linking group containing a sulfur atom. The solid electrolyte exhibits a high ion conductivity.

18 Claims, 1 Drawing Sheet

OTHER PUBLICATIONS

Slade, Robert C.T., Varcoe, John R., "Proton conductivity in siloxane and ormosil ionomers prepared using mild sulfonation methodologies", Solid State Ionics 145 (2001) 127-133.

Kerres, J.A., "Development of Ionomer membranes for fuel cells", Journal Of Membrane Science, Elsevier Scienfific Publ, Company, Amsterdam, Netherlands, vol. 185, Apr. 15, 2001, pp. 3-27, XP 002226657 ISSN: 0376-7388.

European Search Report for Application No. EP 06 00 98296 dated Nov. 22, 2006.

* cited by examiner

SOLID ELECTROLYTE, MEMBRANE AND ELECTRODE ASSEMBLY, AND FUEL CELL

BACKGROUND OF THE INVENTION

1. Field of the Invention

The present invention relates to a fuel cell that directly uses pure hydrogen, methanol, ethanol, diethyl ether, or reformed hydrogen from methanol or fossil fuels as a fuel, and air or oxygen as an oxidizing reagent, and particularly to materials and a membrane and electrode assembly used in a solid polymer fuel cell, and a fuel cell.

2. Description of the Related Art

In these years, a fuel cell, which is can be utilized as a power source for next generation, is actively studied, and a solid electrolyte, which is an element thereof as a proton conductive material, is also actively studied.

In general, as a proton conductive material, a per fluorocarbon sulfuric acid film as represented by Nation (registered trademark) is used. However, it has not sufficient proton conductivity yet. But, increase in an amount of sulfuric acid group in the polymer structure for the purpose of enhancing the proton conductivity results in decrease in mechanical strength and volatilization in an aqueous solvent. Further, it has such problem that it softens under high temperature conditions (100° C. or more) to result in decrease in the proton conductivity, which makes use of Nafion® difficult at high temperature regions (100-140° C. or more). In addition, there also remains such problems that a monomer to be used is relatively expensive and the complex production method pushes up the production cost.

There are many examples of developing a solid electrolyte using a polymer raw material with a high rigidity. On the other hand, in these years, a solid electrolyte, which uses a resin material with a high solvent resistance among polymer raw materials, has been studied. For example, there are disclosures about a solid electrolyte mainly employing suffocated polyether ether ketene, suffocated polysulfide or suffocated polyether ketene in JP-A-6-49202, JP-A-6-93114, JP-A-8-20716, JP-A-9-245818 and JP-A-10-21943. However, in all of these solid electrolytes, since a sulfuric acid group directly bonds to an aromatic ring in the polymer main chain, there is such problem that the sulfuric acid group is gradually detached due to a high operation temperature to result in lowering in battery performance. Further, since the sulfuric acid group bonds directly to the polymer main chain, distance between the main chain as a hydrophobic site and the sulfuric acid group as a hydrophilic site is short to lead to absorption of water molecules beyond necessity, thereby resulting in such problem that a low introduction amount of the sulfuric acid group makes the compound soluble in an aqueous solvent.

In Japanese Patent No. 3607862, a solid electrolyte is manufactured by bonding a sulfuric acid group, via an alkyl group, to an aromatic ring in the polymer main chain synthesized by polycondensation. The method aims to enhance the proton conductivity and mechanical strength by bonding a sulfuric acid group to the main chain via a ethylene group and thus separating the hydrophobic site of the main chain from the hydrophilic site of a side chain having the sulfuric acid group with a relatively large distance. However, as it now stands in actual, since the reaction efficiency is very low, only a small amount of sulfuric acid groups are introduced and the hydrophilic site of the side chain having the sulfuric acid group is not sufficiently separated from the hydrophobic site of the main chain.

SUMMARY OF THE INVENTION

It is an object of the present invention to solve the above-described problems, and to provide a solid electrolyte having a high ion conductivity.

The present inventors found that, by bonding a sulfuric acid group to an aromatic ring in the polymer main chain not directly but via an alkyl chain containing a sulfur atom, the sulfuric acid group is not detached at high operation temperatures, thereby not leading to lowering in the battery performance.

In addition, we found that, by bonding a sulfuric acid group via an alkyl chain containing a sulfur atom, the solid electrolyte does not become water-soluble when the amount of the sulfuric acid group is increased more than ever in order to raise the proton conductivity, to enhance the battery performance.

Further, we found that use of the solid electrolyte of the invention as a binder of a catalyst layer can advance the battery performance because it enhances electrochemical adhesion between the solid electrolyte and the catalyst layer. Furthermore, we found that, by bonding a sulfuric acid group to an aromatic ring in the polymer main chain via an alkyl chain containing a sulfur atom, the distance between the polymer main chains is widened with the alkyl chain to raise the diffusion performance for oxygen and hydrogen as fuels in a catalyst layer, thereby completing the invention. Specifically, the object was achieved according to the following means.

(1) A solid electrolyte having an aromatic ring in a main chain, wherein a sulfuric acid group bonds to the aromatic ring via a linking group containing a sulfur atom.

(2) The solid electrolyte described in (1), wherein the sulfuric acid group boding to the aromatic ring via the linking group containing a sulfur atom is represented by the formula (1) below:

Formula (1)

wherein $B^1$ and $B^2$ each independently represents a linking group, X represents a group containing a sulfur atom, M represents a action, and m1 represents an integer of 1 or more.

(3) The solid electrolyte described in (2), wherein the X is S, SO or $SO_2$.

(4) The solid electrolyte described in (2) or (3), wherein the m1 in the formula (1) is an integer of 1-6.

(5) The solid electrolyte described in any one of (2)-(4), wherein the $B^1$ and $B^2$ in the formula (1) is each independently a linking group having 0-100 carbon atoms selected from the group consisting of an alkaline group, an Arlene group, an alkenylene group, an alkynylene group, an amide group, an ester group, a sulfonamide group, a subtonic acid ester group, an redo group, a sulfonylurea group, a slimly group, a throatier group, an ether group, a carbonyl group, a heteryllene group, and a group constituted by combining 2 or more of these.

(6) The solid electrolyte described in any one of (2)-(5), wherein the main chain includes at least one type of repeating unit represented by the formula (2) below and a group represented by the formula (1) bonds to an aromatic ring contained in the main chain:

Formula (2)

wherein $R^1$ is any of structures represented by formulae (6)-(25) below:
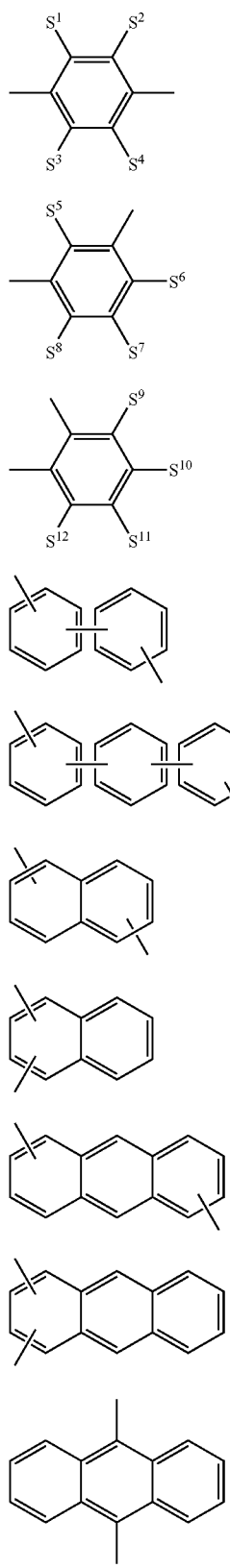
Formula (6)
Formula (7)
Formula (8)
Formula (9)
Formula (10)
Formula (11)
Formula (12)
Formula (13)
Formula (14)
Formula (15)
-continued
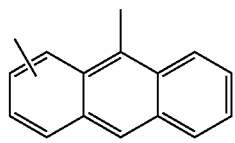
Formula (16)
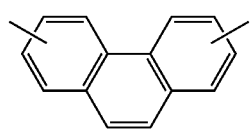
Formula (17)
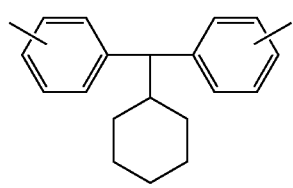
Formula (18)
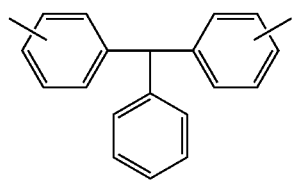
Formula (19)
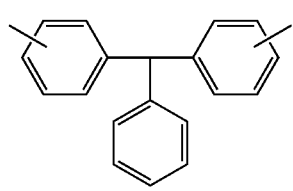
Formula (20)
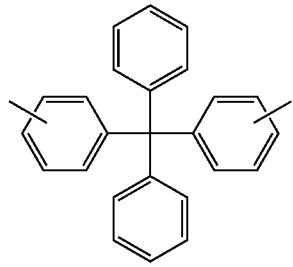
Formula (21)
Formula (22)

-continued

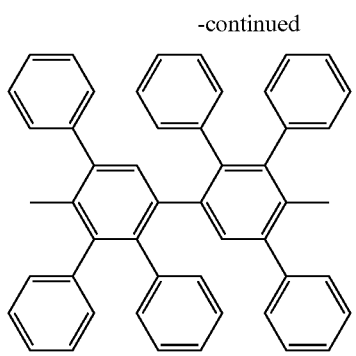
Formula (23)

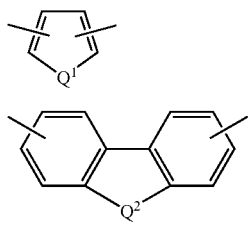
Formula (24)

Formula (25)

wherein $S^1$-$S^{12}$ in formulae (6)-(8) each independently represents a hydrogen atom or a substitution group; $Q^1$ in the formula (24) represents —O— or —S—; and $Q^2$ in the formula (25) represents —O—, —CH$_2$—, —CO— or —NH$_2$—; X represents a single bond, —C(R$^5$R$^6$)—, —O—, —S—, —CO—, —SO— —SO$_2$—, or a combination of 2 or more of these, wherein R$^5$ and R$^6$ each independently represents a hydrogen atom, an alkyl group, an alchemy group, an aryl group or a halogen-substituted alkyl group.

(7) The solid electrolyte described in any one of (1)-(6), wherein the solid electrolyte is in the form of a film.

(8) A film for a fuel cell, including the solid electrolyte described in (7) and a gas diffusion electrode consisting of a cathode electrode and an anode electrode sandwiching the solid electrolyte there between.

(9) The film for a fuel cell described in (8), wherein the gas diffusion electrode is an electrode in which a fine particle of catalyst metal is carried on the surface of a conductive material composed of a carbon material by a binder.

(10) The film for a fuel cell described in (9), wherein the binder includes the solid electrolyte described in any one of (1)-(6).

(11) A membrane and electrode assembly including the solid electrolyte described in (7) and a gas diffusion electrode consisting of a cathode electrode and an anode electrode sandwiching the solid electrolyte there between.

(12) The membrane and electrode assembly described in (11), wherein the gas diffusion electrode is an electrode in which a fine particle of catalyst metal is carried on the surface of a conductive material composed of a carbon material by a binder.

(13) The membrane and electrode assembly described in (12), wherein the binder includes the solid electrolyte described in any one of (1)-(6).

(14) A fuel cell including the film for a fuel cell described in any one of (8)-(10).

(15) The fuel cell described in (14) further including a pair of gas-impermeable separators that are arranged so as to sandwich the gas diffusion electrode.

(16) The fuel cell described in (15) further including a pair of current collectors arranged between the solid electrolyte and the separator.

(17) A method for producing the solid electrolyte described in (3), comprising reacting a monomer containing at least 1 suffocate group and at least 2 releasable groups with a co monomer containing at least 2 releasable groups to form a suffocated polymer and removing the releasable groups by condensation of the monomer and the co monomer through the reaction.

(18) A method for producing the solid electrolyte described in (3), comprising introducing a halogen methyl group into an aromatic ring of an aromatic ring-containing polymer, and then reacting the same with a compound having a group containing a suffocate group and a sulfur atom.

The invention makes it possible to provide a solid electrolyte film using a solid electrolyte excellent in ion conductivity, and a binder for a catalyst layer using a solid electrolyte excellent in ion conductivity and gas diffusivity.

BEST MODE FOR CARRYING OUT THE INVENTION

Figure 1:
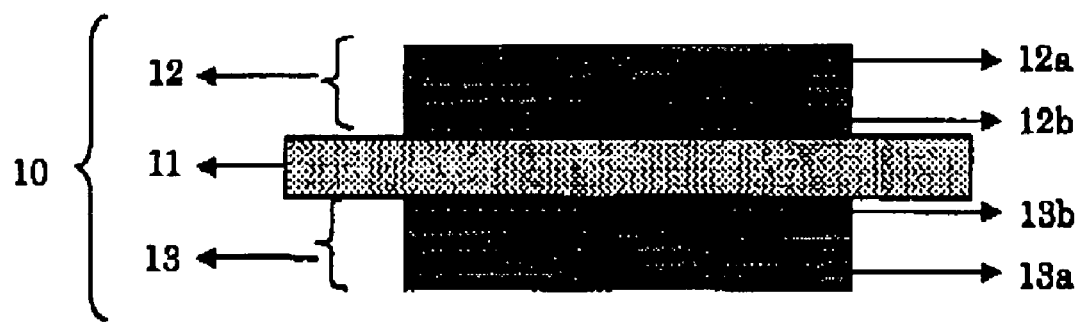
FIG. 1 is a schematic cross-sectional view showing a constitution of a catalyst electrode-bonding film employing the solid electrolyte of the invention.

Hereinafter, contents of the present invention will be described in detail. In this connection, in the specification of the present application, "-" is used in such meaning that numeric values described at before and after it are included as the lower limit and the upper limit, respectively. Further, "an A-substituted B group" means a B group substituted by an A. For example, a halogen-substituted alkyl group means an alkyl group substituted by a halogen atom.

The invention relates to a solid electrolyte including a polymer compound having the main chain containing an aromatic ring and a sulfuric acid group bonding to the aromatic ring contained in the main chain via a linking group containing a sulfur atom. Particularly, the solid electrolyte of the invention can be preferably used for a fuel cell.

In the invention, preferably a group represented by formula (1) bonds to an aromatic ring contained in the main chain.

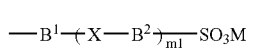
Formula (1)

wherein $B^1$ and $B^2$ each independently represents a linking group, X represents a group containing a sulfur atom, M represents a action, and m1 represents an integer of 1 or more.

In the formula (1), $B^1$ and $B^2$ each independently represents a linking group. The linking group preferably represents a linking group having 0-100 carbon atoms (preferably 1-20 carbon atoms) selected from an alkaline group (preferably an alkaline group having 1-20 carbon atoms such as a ethylene group, an ethylene group, a methyl ethylene group, a propylene group, a methyl propylene group, a butylenes group, a pestilence group, a beryline group and an acetylene group), an Arlene group (preferably an Arlene group having 6-26 carbon atoms such as a 1,2-phenyl group, a 1,3-phenyl group, a 1,4-phenyl group, a 4-phenylenemethylene group and a 1,4-naphthalene group), an alkenylene group (preferably an alkenylene group having 2-20 carbon atoms such as an ethenylene group, a provenience group and a butadienylene group), an alkynylene group (preferably an alkynylene group having 2-20 carbon atoms such as an ethynylene group and a propynylene group), an amide group, an ester group, a sulfonamide group, a sulfuric acid ester group, an redo group, a sulfonylurea group, a sulfynyl group, a throatier group, an ether group, a carbonyl group, a heteryllene group (preferably a heteryllene group having 1-26 carbon atoms such as a 6-chloral-1,3,5-triangle-2,4-idyll group, a pyramiding-2,4-idyll group, a quinoxaline-2,3-idyll group), and a combination of 2 or more of these. These groups may have a substituent within a range of not deviating from the purpose of the invention, but one having no substituent is preferable. Among these, a group containing an alkaline group, an alkynylene group, an Arlene group, a throatier group or an ether group is more preferable, and a group containing an alkaline group, an Arlene group, a throatier group or an ether group is further preferable.

In the formula (1), X contains 1 or 2 or more sulfur atoms, and may be constituted of sulfur atoms alone, or sulfurs atom and other atoms. Preferably, it is a group containing at least one of —S—, —SO— and —SO$_2$—.

In the formula (1), M represents a action, and is preferably selected from the group consisting of a proton, alkali metal (lithium, sodium, potassium) captions, alkali earth metal (potassium, strontium, barium) captions, quaternary ammonium (trimethylammonium, triethylammonium, tributylammonium, benzyltrimethylammonium) captions, and prorogated organic basic groups (diethylamide, pyridine, methylimidazole, morph line, tributylammonium, tris(2-hydroxyethyl) amine), and is more preferably a proton.

In the formula (1), m1 is preferably an integer of 1-6, more preferably an integer of 1-3.

When the group represented by the formula (1) forms a salt, the proton of the acid residue is preferably substituted with a action listed below. The substitution ratio (action/acid residue) is 0-1, and preferably 0.1 or less when the solid electrolyte is used as a solid electrolyte for a fuel cell, although there is no particular restriction during the synthesis process of the solid electrolyte. Examples of the action for forming a salt include preferably alkali metal (lithium, sodium, potassium) captions, alkali earth metal (potassium, strontium, barium) captions, quaternary ammonium (trimethylammonium, triethylammonium, tributylammonium, benzyltrimethylammonium) captions and prorogated organic basic groups (diethylamide, pyridine, methylimidazole, morph line, tributylammonium, tris(2-hydroxyethyl)amine), more preferably alkali metal captions and ammonium captions, and particularly preferably alkali metal captions.

Examples of the group represented by the formula (1) will be shown below, but the invention is not restricted to these.

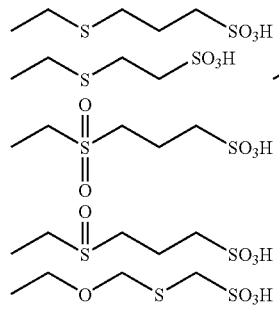

The main chain of the solid electrolyte that is employed in the invention has preferably at least one type of repeating unit represented by the formula (2), and is more preferably constituted of the repeating unit represented by the formula (2). Description will be given below about the formula (2).

 Formula (2)

wherein $R^1$ is any of structures represented by following formulae (6)-(25), and structures (6)-(9) are preferable.

Bonding groups of (9)-(14), (17)-(21), (23) and (24) may bond at any position, but, preferably, adjacent groups bond so that they are in para positions with each other.

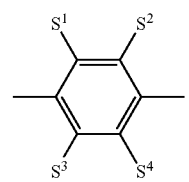

Formula (6)

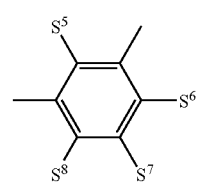

Formula (7)

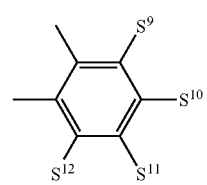

Formula (8)

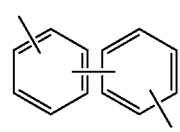

Formula (9)

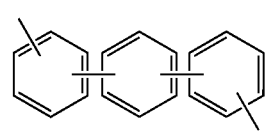

Formula (10)

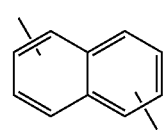

Formula (11)

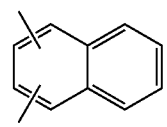

Formula (12)

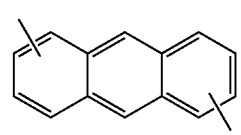

Formula (13)

-continued

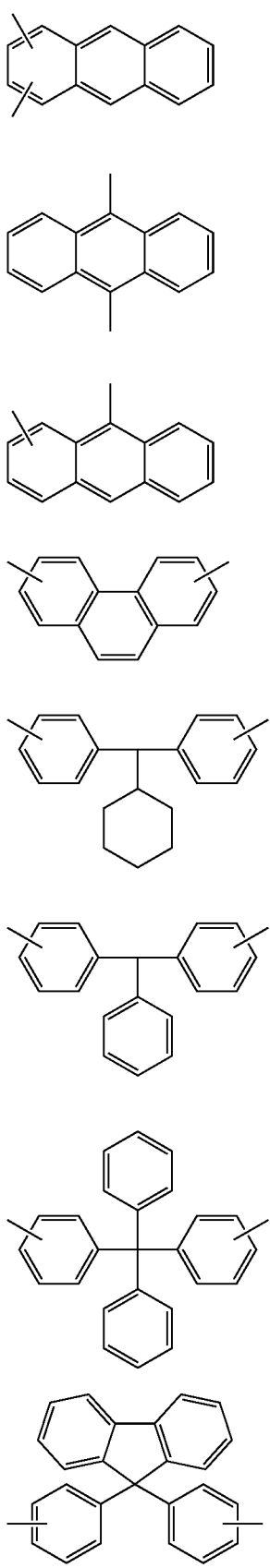

Formula (14)

Formula (15)

Formula (16)

Formula (17)

Formula (18)

Formula (19)

Formula (20)

Formula (21)

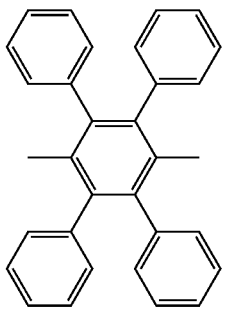

Formula (22)

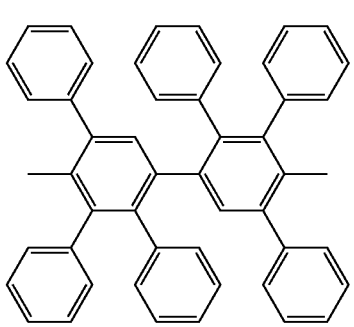

Formula (23)

Formula (24)

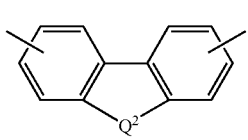

Formula (25)

In formulae (6)-(8), $S^1$-$S^{12}$ each independently represents a hydrogen atom or a substituent. Examples of the substituent include an alkyl group, a halogen-substituted alkyl group, an aryl group, a halogen-substituted aryl group, an alkynes group, a halogen-substituted alkynes group, a hydroxyl group, a carbonyl group, a sulfuric acid, a carboxylic group, a phosphoric acid group, a throatier group and an ether group.

In the formula (24), $Q^1$ represents —O— or —S—.

In the formula (25), $Q^2$ represents —O—, —CH$_2$—, —CO— or —NH—.

X represents a single bond, —C(R$^5$R$^6$)—, —O—, —S—, —CO—, —SO— —SO$_2$—, or a combination of 2 or more of these, wherein R$^5$ and R$^6$ each independently represents a hydrogen atom, an alkyl group (for example, a methyl group, an ethyl group, a benzyl group or the like), an alchemy group, an aryl group or a halogen-substituted alkyl group (for example, a trifluoromethyl group or pentafluoroethyl group), and more preferably —C(CH$_3$)$_2$—, —C(CF$_3$)$_2$—, —O—, —S—, —CO— or —SO$_2$—.

Each of the repeating units represented by the formula (2) may be contained by one type alone, or by 2 or more types.

Examples of the main chain of the polymer compound that is employed in the invention will be shown below, but the invention is not restricted to these.

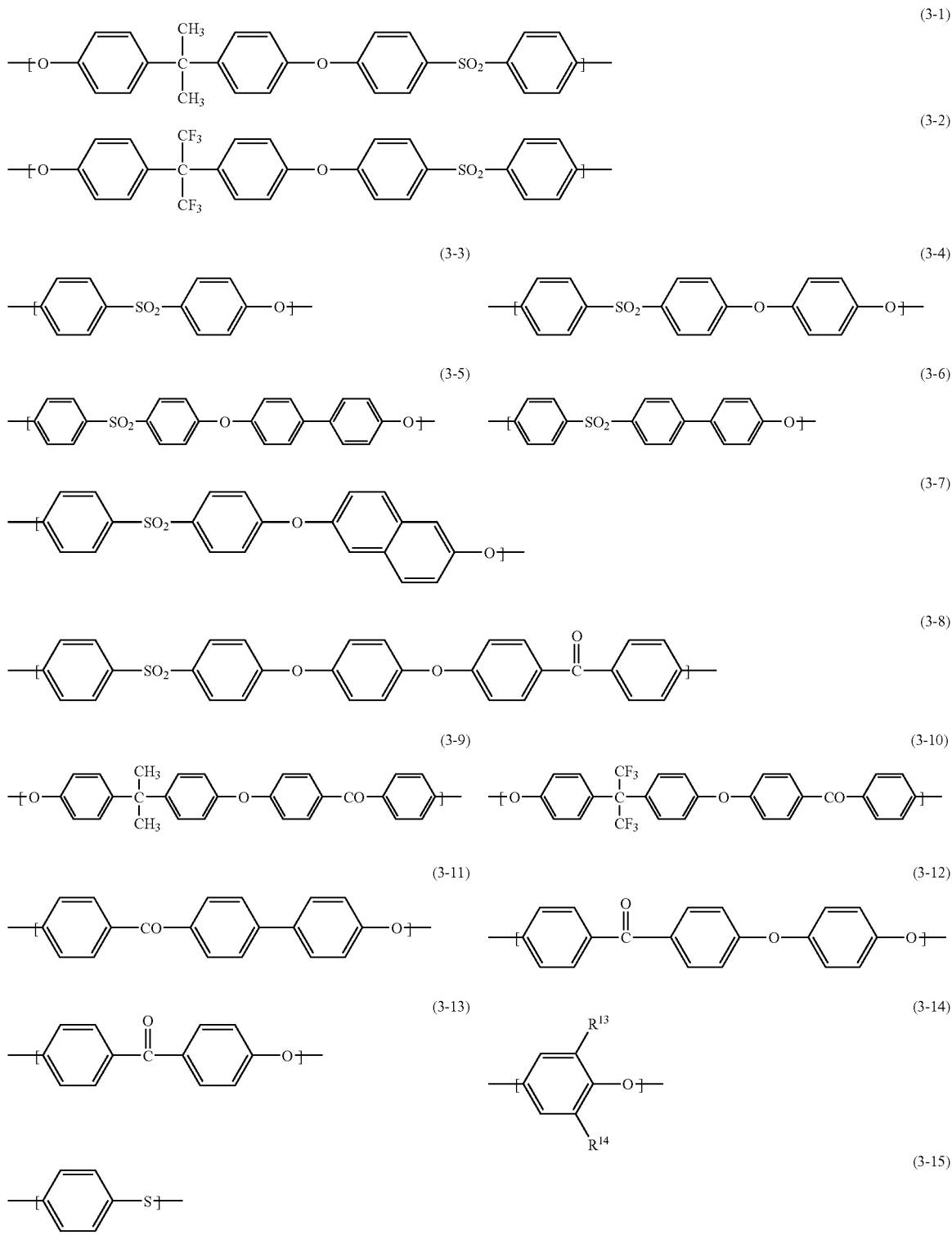

Here, $R^{13}$ and $R^{14}$ each independently represents an alkyl group having 1-10 carbon atoms or a phenyl group having 6-12 carbon atoms.

A sulfuric acid group may bond, via a group containing a sulfur atom, to any site of the aromatic ring in the main chain, but preferably to an aromatic ring constituting biphenyl or an aromatic ring bonded with an electron attracting group.

In the invention, as an example of a method for synthesizing a polymer compound to which a sulfuric acid group is not introduced yet, there can be mentioned a production method in which a compound represented by the formula (26) below is polymerized (preferably polycondensed) with a compound represented by the formula (27) below.

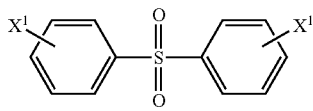

Formula (26)

wherein $X^1$ represents a halogen atom (such as a fluorine atom and chlorine atom) or a nitro group. Two X's may be identical to or different from each other.

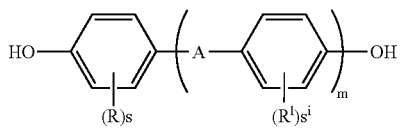

Formula (27)

wherein A has the same meaning and preferable range as those for X in the above-described formula (2). m is 0, 1 or 2. R and $R^i$ each independently represents an alkyl group having 1-10 carbon atoms, and is preferably a methyl group or an ethyl group. s and $s^i$ each independently represents 0 or an integer of 1-4, and is preferably 0 or 1.

Specific examples of the compound represented by the formula (26) include the following compounds.

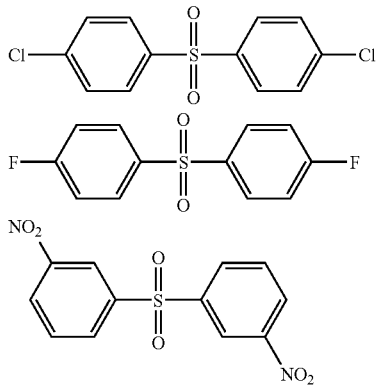

These compounds may be used singly or in a combination of 2 or more types.

Specific examples of the compound represented by the formula (27) include hydroquinone, resorcinol, 2-methyl hydroquinone, 2-ethyl hydroquinone, 2-propylhydroquinone, 2-butyl hydroquinone, 2-hexylhydroquinone, 2-octylhydroquinone, 2-decanylhydroquinone, 2,3-dimethylhydroquinone, 2,3-diethyl hydroquinone, 2,5-dimethylhydroquinone, 2,5-diethyl hydroquinone, 2,6-dimethylhydroquinone, 2,3,5-trimethylhydroquinone, 2,3,5,6-tetramethylhydroquinone, 4,4'-dihydroxybiphenyl, 2,2'-dihydroxybiphenyl, 3,3'-diethyl-4,4'-dihydroxybiphenyl, 3,3',5,5'-tetraethyl-4,4'-dihydroxybiphenyl, 3,3'-dichloride-4,4'-dihydroxybiphenyl, 3,3',5,5'-tetrachloride-4,4'-dihydroxybiphenyl, 3,3'-dayroom-4,4'-dihydroxybiphenyl, 3,3',5,5'-tetrabromo-4,4'-dihydroxybiphenyl, 3,3'-dilutor-4,4'-dihydroxybiphenyl, 3,3',5,5'-tetrafluoro-4,4'-dihydroxybiphenyl, 4,4'-dihydroxydiphenylmethane, 2,2'-dihydroxydiphenylmethane, 3,3'-diethyl-4,4'-dihydroxydiphenylmethane, 3,3',5,5'-tetraethyl-4,4'-dihydroxydiphenylmethane, 3,3'-dichloride-4,4'-dihydroxydiphenylmethane, 3,3',5,5'-tetrachloride-4,4'-dihydroxydiphenylmethane, 3,3'-dayroom-4,4'-dihydroxydiphenylmethane, 3,3',5,5'-tetrabromo-4,4'-dihydroxydiphenylmethane, 3,3'-dilutor-4,4'-dihydroxydiphenylmethane, 3,3',5,5'-tetrafluoro-4,4'-dihydroxydiphenylmethane, 4,4'-dihydroxydiphenyl ether, 2,2'-dihydroxydiphenyl ether, 3,3'-diethyl-4,4'-dihydroxydiphenyl ether, 3,3',5,5'-tetraethyl-4,4'-dihydroxydiphenyl ether, 3,3'-dichloride-4,4'-dihydroxydiphenyl ether, 3,3',5,5'-tetrachloride-4,4'-dihydroxydiphenyl ether, 3,3'-dibromo-4,4'-dihydroxydiphenyl ether, 3,3',5,5'-tetrabromo-4,4'-dihydroxydiphenyl ether, 3,3'-dilutor-4,4'-dihydroxydiphenyl ether, 3,3',5,5'-tetrafluoro-4,4'-dihydroxydiphenyl ether, 4,4'-dihydroxydiphenyl sulfide, 2,2'-dihydroxydiphenyl sulfide, 3,3'-diethyl-4,4'-dihydroxydiphenyl sulfide, 3,3',5,5'-tetraethyl-4,4'-dihydroxydiphenyl sulfide, 3,3'-dichloride-4,4'-dihydroxydiphenyl sulfide, 3,3',5,5'-tetrachloride-4,4'-dihydroxydiphenyl sulfide, 3,3'-dibromo-4,4'-dihydroxydiphenyl sulfide, 3,3',5,5'-tetrabromo-4,4'-dihydroxydiphenyl sulfide, 3,3'-dilutor-4,4'-dihydroxydiphenyl sulfide, 3,3',5,5'-tetrafluoro-4,4'-dihydroxydiphenyl sulfide, 4,4'-dihydroxydiphenyl sulfide, 2,2'-dihydroxydiphenyl sulfide, 3,3'-diethyl-4,4'-dihydroxydiphenyl sulfide, 3,3',5,5'-tetraethyl-4,4'-dihydroxydiphenyl sulfide, 3,3'-dichloride-4,4'-dihydroxydiphenyl sulfide, 3,3',5,5'-tetrachloride-4,4'-dihydroxydiphenyl sulfide, 3,3'-dibromo-4,4'-dihydroxydiphenyl sulfide, 3,3',5,5'-tetrabromo-4,4'-dihydroxydiphenyl sulfide, 3,3'-dilutor-4,4'-dihydroxydiphenyl sulfide, 3,3',5,5'-tetrafluoro-4,4'-dihydroxydiphenyl sulfide, 2,2-bis(4-hydroxyphenyl)propane, 2,2-bis(2-hydroxyphenyl)propane, 2,2-bis(3-methyl-4-hydroxyphenyl)propane, 2,2-bis(3-chloral-4-hydroxyphenyl)propane, 2,2-bis(3,5-dichloride-4-hydroxyphenyl)propane, 2,2-bis(3-broom-4-hydroxyphenyl)propane, 2,2-bis(3,5-dibromo-4-hydroxyphenyl)propane, 2,2-bis(3-flour-4-hydroxyphenyl)propane, 2,2-bis(3,5-dilutor-4-hydroxyphenyl)propane, 2,2-bis(3,5-diethyl-4-hydroxyphenyl)propane, α,α'-bis(4-hydroxyphenyl)-1,4-diisopropylbenzene, α,α'-bis(2-hydroxyphenyl)-1,4-diisopropylbenzene, α,α'-bis(4-hydroxyphenyl)-1,3-diisopropylbenzene, α,α'-bis(2-hydroxyphenyl)-1,3-diisopropylbenzene, α,α'-bis(3-methyl-4-hydroxyphenyl)-1,4-diisopropylbenzene, α,α'-bis(3,5-diethyl-4-hydroxyphenyl)-1,4-diisopropylbenzene, α,α'-bis(3-methyl-4-hydroxyphenyl)-1,3-diisopropylbenzene and α,α'-bis(3,5-diethyl-4-hydroxyphenyl)-1,3-diisopropylbenzene.

These aromatic idols may be used singly or in a mixture of 2 or more types.

The blending ratio of a compound represented by the formula (26) to a compound represented by the formula (27) is preferably 0.7-1.3 moles, more preferably 0.9-1.1 moles, and further preferably 0.95-1.05 moles of a compound represented by the formula (26) relative to 1 mole of a compound represented by the formula (27).

When polycondensing a compound represented by the formula (26) and a compound represented by the formula (27) to synthesize the proton acid group-containing polysulfide (solid electrolyte) of the invention, a method in which they are polycondensed in the presence of a basic compound is used preferably.

There is no particular restriction on the type of the basic compound, reaction condition and the like, and a publicly known basic compound, reaction condition and the like may be applied. Examples of the basic compound include compounds of basic metals such as alkali metals and alkali earth metals, carbonate, acetate, hydroxide, quaternary ammonium salt and phosphonium salt of various metals, and organic bases.

The use amount of these basic compounds is preferably 0.05-10.0 moles, more preferably 0.1-4.0 moles, and further preferably 0.5-2.5 moles relative to 1 mole of the aromatic idol represented by the formula (27).

The reaction for producing the polymer compound for use in the solid electrolyte of the invention is preferably carried out in a solvent. Preferable examples include such solvents as those described below:

1) Ether-Based Solvent 1,2,-dimethoxymethane, bis(2-methoxyethyl)ether, 1,2-bis(2-methoxyethoxy)ethane, tetrahydrofuran, bis[2-(2-methoxyethoxy)ethyl]ether, 1,4-dioxin, and the like;

2) Paretic Amide-Based Solvent

N,N-dimethylformamide, N,N-dimethylacetamide, N,N-diethylacetamide, N-methyl-2-pyrrolidone, 1,3-diethyl-2-imidazolidinone, N-methylcaprolactam, hexamethylphosphorotriamide and the like;

3) Amine-Based Solvent pyridine, quinoline, isoquinoline, α-Pico line, β-Pico line, γ-Pico line, isochrones, piper dine, 2,4-autodyne, 2,6-autodyne, trim ethylamine, diethylamine, tripropylamine, tributylamine and the like; and 4) Other Solvents diethyl suffixed, diethyl sulfide, biphenyl ether, Sloane, diphenylsulfone, tetramethylurea, anisole and the like.

These solvents may be used singly, or in a mixture of 2 or more types. Further, a solvent represented in item 5) below may also be mixed and used. When the solvent is used in a mixture, it is not necessarily required to select such combination that they are dissolved with each other at an arbitrary ratio. They may be not mixed with each other to become uneven.

The concentration of the reaction (hereinafter, referred to as polymerization concentration) carried out in the solvent is not restricted in any circumstances.

A compound represented by the formula (27) and a compound represented by the formula (26) are reacted in the above-described solvent to give a polysulfide containing a proton acid group. More preferable solvents for the reaction are paretic amide-based solvents in the item 2) and diethyl suffixed in the item 4) described above.

The atmosphere of the reaction is not particularly determined, but an atmosphere of air, nitrogen, helium, neon, argon or the like is preferable, that of an inert gas is more preferable, and that of nitrogen or argon is further preferable.

In addition, in order to remove water generating through the reaction from the reaction system, other solvent may coexist. Examples of the solvent can be used include those described in item 5) below.

5) Benzene, toluene, o-xylem, m-xylem, p-xylem, chlorobenzene, o-dichlorobenzene, m-dichlorobenzene, p-dichlorobenzene, bromobenzene, o-dibromobenzene, m-dibromobenzene, p-dibromobenzene, o-chlorotoluene, m-chlorotoluene, p-chlorotoluene, o-bromotoluene, m-bromotoluene, p-bromotoluene and the like. These solvents may be used singly or in a mixture of 2 or more types.

There is no particular restriction on reaction temperature, reaction time and reaction pressure, and publicly known conditions can be applied. That is, the reaction temperature is preferably 50-300° C., more preferably 100-270° C., and further preferably 130-250° C. The reaction time may be suitably determined according to the type of monomer, the type of solvent, the reaction temperature and the like to be employed, and is preferably 1-72 hours, more preferably 3-48 hours, and further preferably 5-24 hours. As to the reaction pressure, any of increased, reduced and ordinary pressures may be acceptable.

In the invention, in order to introduce a sulfuric acid group to a polymer compound to which a sulfuric acid group is not introduced yet, a following introduction method may be used. In addition to direct introduction of a sulfuric acid group to the polymer compound, a sulfuric acid group may be first introduced to a monomer, which is then polymerized.

For example, there is such method that, when $B^1$ is a ethylene group, it is converted to halogenomethylated polysulfide using a hologenomethylating agent such as chloromethylmethyl ether described later, which is then reacted with a compound containing a throatier bond in an alkyl chain such as sodium 3-Mercator-1-propane suffocate and sodium 2-mercaptoethane suffocate mentioned below.

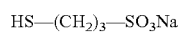

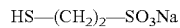

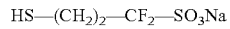

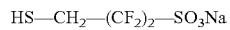

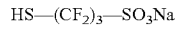

In the invention, examples of the halogen alkyl group include halogen alkyl groups (having 1-6 carbon atoms) such as a chloromethyl group, a bromomethyl group, an iodomethyl group, a chloroethyl group, a bromoethyl group, an iodoethyl group, a chloropropyl group, a bromopropyl group, an iodopropyl group, a chlorobutyl group, a bromobutyl group, an iodobutyl group, a chloropentyl group, a bromopentyl group, an iodopentyl group, a chlorohexyl group, a bromohexyl group and an iodohexyl group. Among them, a halogen methyl group is preferable.

In order to introduce a halogen methyl group that is preferable in the invention to an aromatic ring (halogenomethylating reaction of an aromatic ring), publicly known reactions can be used broadly. For example, a chloromethyl group is introduced to an aromatic ring by carrying out a chloromethylating reaction by using chloromethylmethyl ether, 1,4-bis(chloromethoxy)butane, 1-chloromethoxy-4-chlorobutane or the like as a chloromethylating agent, and a Lewis acid such as tin chloride, zinc chloride, aluminum chloride and titanium chloride or hydrofluoric acid as a catalyst. The reaction is preferably carried out in a homogeneous system using such solvent as dichloromethane, dichloromethane, tetrachloroethane, chlorobenzene, dichlorobenzene or nitrobenzene. Further, Para formaldehyde and hydrogen chloride or hydrogen bromide may be used to carry out a halogenomethylation reaction.

The amount of the sulfuric acid group in the aforementioned polymer compound obtained according to the aforementioned way is preferably 0.05-2, more preferably 0.3-1.5 relative to one unit of the unit (B) constituting the polymer. The sulfuric acid group of 0.05 or more makes the proton conductivity of the solid electrolyte higher, and, on the other hand, the group of 2 or less can more effectively inhibit the polymer compound from becoming water-soluble polymer due to a too enhanced hydrophilic, or from decreasing in durability even if it is not lead to be water-soluble.

The molecular weight of polymer precursor thus obtained, which will become the polymer compound of the invention after suffocation, is preferably 1,000-1,000,000, more preferably 1,500-200,000 in weight-average molecular weight in terms of polystyrene. The molecular weight of 1,000 or more can more effectively inhibit insufficiency in film properties such as generation of a crack in a molded film, and can more effectively enhance strength properties. On the other hand, that of 1,000,000 or less can more effectively inhibit such problems that solubility becomes insufficient or the solution viscosity is high to result in poor process ability.

In this connection, the structure of the polymer compound used in the invention can be checked by infrared spectrum of S=O absorption at 1,030-1,045 cm$^{-1}$ and 1,160-1,190 cm$^{-1}$, C—O—C absorption at 1,130-1,250 cm$^{-1}$, C=O absorption at 1,640-1,660 cm$^{-1}$ and the like. The composition ratio of these can be known by neutralization titration of the sulfuric acid or elemental analysis. Further, the construction can be checked from the peak of an aromatic proton at 6.8-8.0 ppm by a nuclear magnetic resonance spectrum ($^1$H-NMR).

The solid electrolyte of the invention contains the above-described polymer compound, and may contain, in addition, an inorganic acid such as sulfuric acid, phosphoric acid and heterophony acid, an organic acid such as carboxylic acid, or a suitable amount of water, in combination.

In a film-forming process, film-forming may be carried out by extrusion molding, casting or coating of a liquid prepared by holding the polymer compound as a raw material at a temperature higher than the melting point thereof, or by dissolving the compound using a solvent. These operations can be practiced by using a film-forming machine provided with rolls such as calendar rolls or cast rolls, or a T die, or by press molding using a press machine. Stretching process may be added to control film thickness or improve film properties.

Further, the film may be subjected to surface treatment after the film-forming process. Such surface treatments can be mentioned as surface roughening, surface cutting, removing and coating. Sometimes these treatments can improve adherence of the film with an electrode.

The solid electrolyte to be obtained preferably is in the form of a film, whose thickness is preferably 10-500 μm, more preferably 25-150 μm. It may be molded to be a film shape, or molded in a balk body and then cut and processed into a film shape.

The solid electrolyte of the invention may be impregnated in fine pores of a porous substrate to form a film. A film may be formed by coating and impregnating a reaction solution having been subjected to the second process to a porous substrate, or by dipping the substrate in the reaction solution to fill fine pores with the solid electrolyte. Preferable examples of the substrate having fine pores include porous polypropylene, porous polytetrafluoroethylene, porous cross-linked heat resistant polyethylene and porous polyimide.

Other Ingredients of the Solid Electrolyte

To the solid electrolyte of the invention, according to need, an oxidation inhibitor, a fiber, a fine particle, a water-absorbing agent, a plasticizer, a compatibilizing agent or the like may be added in order to enhance film properties. The content of these additives is preferably in a range of 1-30% by mass relative to the total amount of the solid electrolyte.

Preferable examples of the oxidation inhibitor include (hindered)phenol-based, mono- or divalent sulfur-based, tri- or penta-phosphorous-based, benzophenone-based, benzotriazole-based, hindered amine-based, cyanoacrylate-based, salicylate-based, and oxalic acid aniline-based compounds. Specifically, compounds described in JP-A-8-53614, JP-A-10-101873, JP-A-11-114430 and JP-A-2003-151346 can be mentioned.

Preferable examples of the fiber include perfluorocabon fiber, cellulose fiber, glass fiber, polyethylene fiber and the like. Specifically, fibers described in JP-A-10-312815, JP-A-2000-231928, JP-A-2001-307545, JP-A-2003-317748, JP-A-2004-63430 and JP-A-2004-107461 can be mentioned.

Preferable examples of the fine particle include fine particles composed of silica, alumina, titanium oxide, zirconium oxide and the like. Specifically, those described in JP-A-6-111834, JP-A-2003-178777, and JP-A-2004-217921 can be mentioned.

Preferable examples of the water-absorbing agent (hydrophilic material) include cross-linked polyacrylates, starch-acreages, oval, polyacrylonitrile, carboxymethyl cellulose, polyvinylpyrrolidone, polyglycol dialkylether, polyglycol dialkylester, silica gel, synthesized elite, alumina gel, titanic gel, zirconium gel, and yttrium gel. Specifically, water-absorbing agents described in JP-A-7-135003, JP-A-8-20716 and JP-A-9-251857 can be mentioned.

Preferable examples of the plasticizer include phosphoric acid ester-based compounds, ophthalmic acid ester-based compounds, aliphatic monobasic acid ester-based compounds, aliphatic dibasic acid ester-based compounds, dihedral alcohol ester-based compounds, ox acid ester-based compounds, chlorinated paraffin's, alkyl naphthalene-based compounds, sulfide alkyl amide-based compounds, olio ethers, carbonates, and aromatic nitrides. Specifically, those described in JP-A-2003-197030, JP-A-2003-288916, and JP-A-2003-317539 can be mentioned.

Further, the solid electrolyte of the invention may be incorporated with various polymer compounds for the purpose of (1) enhancing mechanical strength of the film, or (2) enhancing acid concentration in the film.

(1) For the purpose of enhancing mechanical strength, such polymer compound is suitable that has molecular weight of around 10,000-1,000,000 and good compatibility with the solid electrolyte of the invention. For example, per fluorinated polymer, polystyrene, polyethylene glycol, polyurethane, poly(meth)acryl ate, polyether ketene, polyether sulfide, and polymers of 2 or more of these are preferable, and preferable content is in a range of 1-30% by mass relative to the whole.

When the solid electrolyte of the invention is used for a fuel cell, a solid electrolyte composite film that is obtained by combining the solid electrolyte with a support may be used. Here, the support constitutes a base material into which the solid electrolyte of the invention is impregnated, and is used mainly for further enhancing strength, flexibility and durability of the solid electrolyte of the invention. Accordingly, a material that satisfies the above-described intended purpose may be used independently of the shape, such as a fibril shape or porous film shape, and material. However, use of a porous film is very effective when taking convenient use as a barrier film of a solid polymer electrolyte fuel cell into consideration.

A porous film used for the purpose has a thickness of ordinarily 1-300 μm, preferably 3-150 μm, and more preferably 5-100 μm; a pore diameter of ordinarily 0.01-10 μm, and preferably 0.02-7 μm; and a porosity of ordinarily 20-98%, and preferably 30-95%. The thickness of a porous support film of 1 μm or more results in a more effective strength addition or reinforcement such as giving flexibility and durability after it is made into a composite, whereby gas leakage (cross leak) hardly occurs. On the other hand, the film thickness of 100 μm or less results in a not too high electric resistance, whereby the obtained composite film becomes more preferable as a barrier film of a solid polymer fuel cell. The pore diameter of 0.02 μm or more allows the solid electrolyte to impregnate easily into the pore, and that of 7 μm or less tends to strengthen the reinforcement effect on the solid electrolyte. The porosity of 20% or more makes resistance as a solid electrolyte film not too large, and that of 98% or less tend to inhibit decrease in the reinforcement effect caused by lowering of strength of the porous film itself. The material for the porous support film is preferably an aliphatic polymer or a fluorine-containing polymer from the view point of heat resistance and reinforcement effect on physical strength.

Examples of the aliphatic polymer that can be used suitably include polyethylene, polypropylene, ethylene-propylene copolymer and the like, but are not restricted to these. As the fluorine-containing polymer, publicly known thermoplastic resins having at least one carbon-fluorine bond in the molecule may be used. Ordinarily, those having such structure that all or most of the hydrogen atoms of an aliphatic polymer have been substituted with fluorine atoms are preferably used.

Examples of fluorine-containing polymer that can be preferably used include polytrifluoroethylene, polytetrafluoroethylene, polychlorotrifluoroethylene, poly(tetrafluoroethylene-hexafluoropropylene), poly(tetrafluoroethylene-perfluoroalkyl ether), polyvinylidene fluoride and the like, but are not restricted to these. Among these, in the invention, polytetrafluoroethylene and poly(tetrafluoroethylene-hexafluoropropylene) are preferable, and polytetrafluoroethylene is particularly preferable. These fluorine-containing resins preferably have an average molecular weight of 100,000 or more from the point of good mechanical strength.

When using the solid electrolyte of the invention or a composite film including the solid electrolyte, for a fuel cell, there is no particular restriction on the film thickness, but it is preferably 1-300 μm, more preferably 3-150 μm and further preferably 5-100 μm. A too small film thickness tends to lower the film strength, and a too large film thickness heighten electric resistance, which is undesirable as a barrier film of a solid polymer fuel cell. The film thickness can be controlled by suitably selecting concentration of a polymer electrolyte solution or coating volume of the polymer electrolyte solution, thickness of the porous support film and coating thickness onto the porous support film. Further, additives such as an oxidation inhibitor may be incorporated within a range that does not impair the purpose of the invention.

A compatibilizing agent has a boiling point or sublimation point of preferably 250° C. or more, and more preferably 300° C. or more.

(2) For the purpose of increasing acid concentration, such polymer compound is preferable that has a proton acid site such as per fluorocarbon sulfuric acid polymers as represented by Nafion®, poly(meth)acreages having a phosphoric acid group in a side chain, or suffocated heat resistant aromatic polymers such as suffocated polyether ether ketene, suffocated polyether sulfide, suffocated polysulfide or suffocated polybenzimidazole, which is preferably contained in a range of 1-30% by mass relative to the whole.

As the solid electrolyte of the invention, those having following performances are preferable.

The proton conductivity is preferably 0.1 S/cm or more, and more preferably 0.2 S/cm, for example, in water at 80° C.

As to strength, the storage elastic modulus according to DMA (viscoelastic analysis) is preferably 0.5 GPa or more, more preferably 1.0 GPa or more, and particularly preferably 1.5 GPa or more.

As to durability, rate of change of weight and ion-exchange capacity before and after treatment in 30% hydrogen peroxide at a constant temperature is preferably 20% or less, more preferably 10% or less. Further, a volume swelling ratio in an ion-exchanged water at a constant temperature is preferably 10% or less, more preferably 5% or less. Tg (glass transition temperature) is preferably 120° C. or more, more preferably 150° C. or more, and particularly preferably 170° C. or more.

The solid electrolyte of the invention preferably has a stable water absorption coefficient and moisture content. Further, it preferably has a substantially negligible solubility to alcohols, water and mixed solvents of these. In addition, it preferably has a substantially negligible weight loss and figure change when dipped in the above-described solvent.

When it is formed in a film shape, it preferably has a higher ion conductivity in the direction from front face to rear face compared with those in other directions.

When the solid electrolyte of the invention is formed in a film shape, thickness thereof is preferably 1-300 μm. Heat-resistant temperature of the solid electrolyte of the invention is preferably 100° C. or more, more preferably 150° C. or more, and further preferably 200° C. or more. The heat-resistant temperature can be defined, for example, as a time period when weight loss reaches 5% by heating the film at a rate of 1° C./min. The weight loss is calculated while excluding evaporation quantity of water and the like.

Further, when the solid electrolyte of the invention is used for a fuel cell, an active metal catalyst that facilitates the oxidation-reduction reaction of an anode fuel and a cathode fuel may be added. As the result, fuels permeating into the solid electrolyte are consumed in the solid electrolyte without reaching the other electrode, whereby crossover can be prevented. An active metal type to be used can not be restricted as long as it functions as an electrode catalyst, but platinum or an alloy based on platinum is suitable.

Fuel Cell

The solid electrolyte of the invention can be used for a Membrane and Electrode Assembly (hereinafter, referred to as "MEA") and a fuel cell employing the MEA.

FIG. 1 shows an example of schematic cross-sectional view of the MEA of the invention. The MEA 10 includes a film-shaped solid electrolyte 11, and an anode electrode 12 and a cathode electrode 13 facing to each other while holding the solid electrolyte 11 there between.

The anode electrode 12 and the cathode electrode 13 are composed of porous conductive sheets (for example, carbon paper) 12a, 13a, and catalyst layers 12b, 13b. The catalyst layers 12b, 13b are composed of a dispersed substance prepared by dispersing a carbon particle (such as Kitchen black, acetylene black and carbon nana tube) carrying a catalyst metal such as platinum powder in a proton conductive material (for example, Nafion® or the like). In order to bring the catalyst layers 12b, 13b into close contact with the solid electrolyte 11, such method is generally used that the porous conductive sheets 12a, 13a coated with catalyst layers 12b, 13b are pressure-bonded to the solid electrolyte 11 by a hot press method (preferably 120-130° C., 2-100 kg/cm²), or the catalyst layers 12b, 13b coated on a suitable support are transferred and pressure-bonded to the solid electrolyte 11, which is then sandwiched between the porous conductive sheets 12a, 13a.

Figure 2:
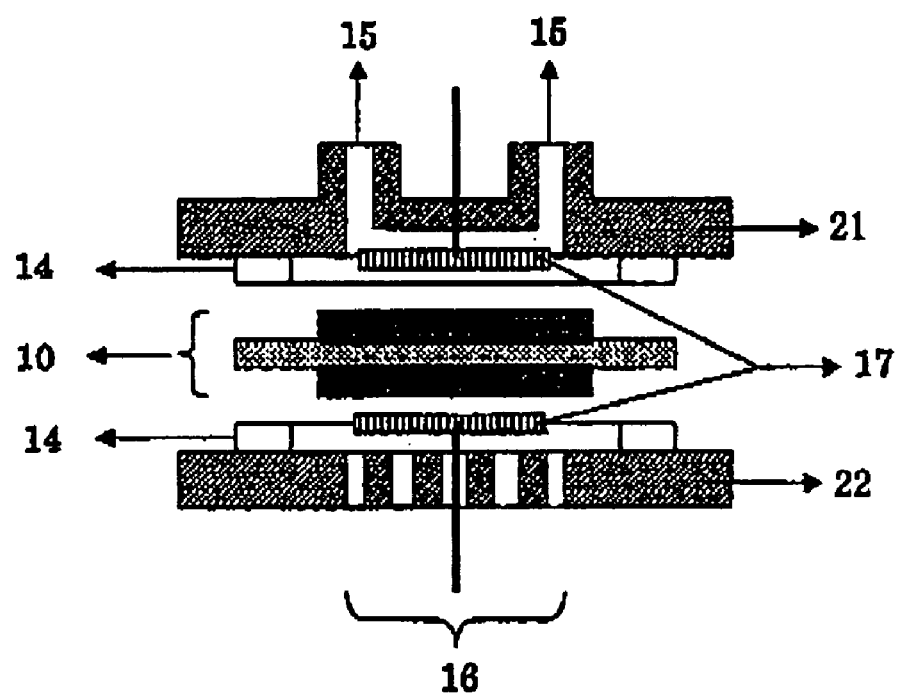
FIG. 2 is a schematic cross-sectional view showing an example of the structure of the fuel cell according to the invention.

FIG. 2 shows an example of a fuel cell structure. The fuel cell includes the MEA 10 and a pair of separators 21, 22 holding the MEA 10 there between, current collectors 17 constituted of a stainless net and attached to the separators 21, 22, and pickings 14. To the anode side separator 21, an anode side opening 15 is arranged, and to the cathode side separator 22, a cathode side opening 16 is arranged. From the anode side opening 15, a gas fuel such as hydrogen or alcohols (methanol etc.) or a liquid fuel such as an aqueous alcohol solution is supplied, and from the cathode side opening 16, an oxidant gas such as oxygen gas or air is supplied.

For the anode electrode and cathode electrode, a catalyst composed of carbon material carrying an active metal particle such as platinum is used. The particle size of the commonly used active metal falls within 2-10 nm. A smaller particle size is advantageous because it leads to a larger surface area per unit mass to result in a enhanced activity, however, a too small size makes it difficult to disperse the particle without aggregation. Thus, the lower limit is said to be around 2 nm.

Activated polarization in a hydrogen-oxygen system fuel cell is greater for a catholic pole (air pole) compared with an anodic pole (hydrogen pole). This is because reaction at the catholic pole (reduction of oxygen) is slower compared with that at the anodic pole. In order to enhance activity of the oxygen pole, various platinum-based bimetals such as Pt—Cr, Pt—Ni, Pt—Co, Pt—Cu, Pt—Fe can be used. In a fuel cell which employs a reformed gas from fossil fuels containing carbon monoxide as anode fuel, suppression of catalyst poisoning by Co is important. For this purpose, platinum-based bimetals such as Pt—Ru, Pt—Fe, Pt—Ni, Pt—Co and Pt—Mo, and timetables such as Pt—Ru—Mo, Pt—Ru—W, Pt—Ru—Co, Pt—Ru—Fe, Pt—Ru—Ni, Pt—Ru—Cu, Pt—Ru—Sn and Pt—Ru—Au can be used.

As to a carbon material for supporting an active metal, acetylene black, Vulcan XC-72, Ketchen black, carbon Nan horn (CNH) and carbon annotate (CNT) are preferably used.

The functions of the catalyst layer are: (1) to transport the fuel to the active metal, (2) to provide a field for oxidation reaction (anodic pole) and reduction reaction (catholic pole) of the fuel, (3) to transmit electrons generated by oxidation-reduction to the current collector, and (4) to transport protons generated by the reaction to the solid electrolyte. In order to accomplish (1), the catalyst layer must be porous to allow the liquid and gas fuels to permeate deeply. (2) is borne by the aforementioned active metal catalyst, and (3) is borne by the also aforementioned carbon material. In order to fulfill the function of (4), the catalyst layer is mixed with a proton conductive material.

As to the proton conductive material of the catalyst layer, that is, a binder, a solid having a proton-donating group can be used without any restriction, but there can be mentioned a film of polymer compounds having an acid residue used for the solid electrolyte, per fluorocarbon sulfuric acid polymers as represented by Nafion®, poly(meth)acreages having a phosphorous group in a side-chain, heat-resistant aromatic polymers such as suffocated polyether ether ketene, suffocated polyether ketene, suffocated polyether sulfide, suffocated polysulfide and suffocated polybenzimidazole, suffocated polystyrene, suffocated polyurethane, suffocated polyimide, suffocated polyphenylene sulfide, suffocated polyphenylene oxide and suffocated polyphenylene. Specifically, there can be mentioned those described in JP-A-2002-110174, JP-A-2002-105200, JP-A-2004-10677, JP-A-2003-132908, JP-A-2004-179154, JP-A-2004-175997, JP-A-2004-247182, JP-A-2003-147074, JP-A-2004-234931, JP-A-2002-289222 and JP-A-2003-208816. Use of the solid electrolyte of the invention for a catalyst layer is more advantageous because it becomes the same kind of material as the solid electrolyte to enhance electrochemical adhesion between the solid electrolyte and the catalyst layer.

Further, a material as the binder of the catalyst layer is required to have such performance that allows the fuel to permeate deeply, and has an oxygen permeability (mol/cm·s) of preferably $5 \times 10^{-12}$ or more, more preferably $8 \times 10^{-12}$, and particularly preferably $1.2 \times 10^{-11}$ at 75° C.

The catalyst layer preferably contains an water repellant additionally. As to the water repellant, fluorine-containing resins having water-repellent property is preferable, and those excellent in heat resistance and oxidation resistance is more preferable. For example, polytetrafluoroethylene, tetrafluoroethylene-perfluoroalkylvinyl ether copolymer and tetrafluoroethylene-hexafluoropropylene copolymer can be mentioned.

Suitable use amount of the active metal falls within 0.03-10 $mg/cm^2$ from the viewpoint of battery output power and economical efficiency. Suitable amount of the carbon material that carries the active metal is 6-10 times the mass of the active metal. Suitable amount of the proton conductive material is 0.1-0.7 time the mass of the active metal-carrying carbon.

The current collector is also called an electrode base material, a permeable layer or a liner substance, and bears roles of function of current collection and prevention of degradation of gas permeation caused by accumulation of water. Usually, carbon paper or carbon cloth is used, and one having been subjected to polytetrafluoroethylene (PTFE) treatment for the purpose of water repellent finish can also be used.

A carbon material is preferably used as a carrier of a catalyst metal (electrode catalyst) such as a platinum particle. Methods for allowing the carrier to carry the catalyst metal include a heat reduction method, a sputtering method, a pulse laser deposition method, a vacuum evaporation method and the like (for example, WO 2002/054514 etc.).

A method for manufacturing the electrode will be described. A fluorine-containing resin-based proton conductive material as represented by Nafion® or the solid electrolyte of the invention is dissolved in a solvent, which is mixed and dispersed with a carbon material carrying a catalyst metal to prepare a dispersion liquid. Preferable examples of the solvent of the dispersion liquid include heterocyclic compounds (such as 3-methyl-2-oxazolidinone and N-methylpyrrolidone), cyclic ethers (such as dioxin and tetrahydrofuran), chain ethers (such as diethyl ether, ethylene glycol daily ether, propylene glycol daily ether, polyethylene glycol daily ether and polypropylene glycol daily ether), alcohols (such as methanol, ethanol, isopropanol, ethylene glycol manually ether, propylene glycol manually ether, polyethylene glycol manually ether and polypropylene glycol manually ether), polyhydric alcohols (ethylene glycol, propylene glycol, polyethylene glycol, polypropylene glycol and glycerin), nitric compounds (such as acetonitryl, glutarodinitrile, methoxyacetonitryl, propyonitryl and benzonitryl), no polar solvents (such as toluene and xylem), chlorine-containing solvents (such as ethylene chloride and ethylene chloride), amides (such as N,N-dimethylformamide, N,N-dimethylacetamide and ace amide) and water. Among these, heterocyclic compounds, alcohols, polyhydric alcohols and amides are preferably used.

The dispersion may be carried Out by stirring, and ultrasonic dispersion, a ball mill and the like may also be used. The resulting dispersion liquid may be coated by using a coating method such as a curtain coating, extrusion coating, roll coating, spin coating, dip coating, bar coating, spray coating, slide coating and print coating methods.

Coating of the dispersion liquid will be described. In a coating process, a film may be formed by extrusion molding, or casting or coating of the above-described dispersion liquid. A support in this case is not particularly restricted, and preferable examples thereof include a glass substrate, a metal substrate, a polymer film, a reflection board and the like.

Examples of the polymer film include a film of cellulose-based polymers such as tracery cellulose (TAC), ester-based polymers such as polyethylene terephthalate (PET) and polyethylene naphtha late (PEN), fluorine-containing polymers such as polytrifluoroethylene (PTFE), and polyimide. The coating may be carried out according to a known system such as a curtain coating, extrusion coating, roll coating, spin coating, dip coating, bar coating, spray coating, slide coating and print coating methods. In particular, use of a conductive porous material (carbon paper, carbon cloth) as the support makes direct manufacture of the catalyst electrode possible.

These operations may be carried out by a film-forming machine that uses rolls such as calendar rolls or cast rolls, or a T die, or press molding by a press machine may also be utilized. Further, a stretching process may be added to control the film thickness or improve film characteristics. As another method, a method, in which an electrode catalyst having been formed in a paste shape as described above is directly sprayed to the solid electrolyte film with an ordinary sprayer to form the catalyst layer, can be also used. Control of the spray time and the spray volume makes formation of a uniform electrode catalyst layer possible.

Drying temperature in the coating process relates to the drying speed, and can be selected in accordance with properties of the material. It is preferably $-20°$ C.-150° C., more preferable 20° C.-120° C., and further preferably 50° C.-100° C. A shorter drying time is preferable from the viewpoint of productivity, however, a too short time tends to easily generate such defects as bubbles or surface irregularity. Therefore, drying time of 1 minute-48 hours is preferable, 5 minutes-10 hours is more preferable, and 10 minutes-5 hours is further preferable. Control of humidity is also important, and relative humidity (RH) is preferably 25-100%, and more preferably 50-95%.

The coating liquid (dispersion liquid) in the coating process preferably contains a small amount of metal ions, and in particular, it contains a small amount of transition metal ions, especially an iron, nickel and cobalt ions. The content of transition metal ions is preferably 500 ppm or less, and more preferably 100 ppm or less. Therefore, solvents used in the aforementioned processes preferably contains these ions in a small amount, too.

Further, a surface treatment may be carried out after performing the coating process. As to the surface treatment, surface roughening, surface cutting, surface removing or surface coating may be performed, which may, in some cases, improve adherence with the solid electrolyte film or the porous conductive material.

Thickness of the catalyst layer included in the MEA of the invention is preferably 5-200 μm, and particularly preferably 10-100 μm.

For manufacturing the MEA, following 4 methods are preferable.

(1) Proton conductive material coating method: wherein a catalyst paste (ink) containing an active metal-carrying carbon, a proton conductive substance and a solvent as fundamental components is directly coated on both sides of the solid electrolyte, to which porous conductive sheets are thermal compression-bonded (hot pressed) to manufacture an MEA of 5-layer structure.

(2) Porous conductive sheet coating method: wherein the catalyst paste is coated on the surface of the porous conductive sheet to form a catalyst layer, followed by thermal compression-bonding (hot pressing) with the solid electrolyte to manufacture an MEA of 5-layer structure. This method is the same as the above-described (1) except that the type of support to be coated is not identical.

(3) Decal method: wherein the catalyst paste is coated on a support (such as a polytetrafluoroethylene (PTFE) sheet) to form a catalyst layer, followed by thermal compression-bonding (hot pressing) to transfer the catalyst layer alone to the solid electrolyte to form a 3-layer MEA, to which a porous conductive sheet is pressure-bonded to manufacture an MEA of 5-layer structure.

(4) Later catalyst carrying method: wherein an ink, in which a carbon substance not carrying a platinum powder has been mixed with a proton conductive substance, is coated on a solid electrolyte, a porous conductive sheet or PTFE to form a film, followed by impregnating platinum ions into the solid electrolyte and reducing the ion to precipitate a platinum powder in the film, thereby forming a catalyst layer. After the formation of the catalyst layer, an MEA is manufactured by the aforementioned methods (1)-(3).

The above-described hot press is preferably carried out under following conditions.

The hot press temperature is ordinarily 100° C. or more, preferably 130° C. or more, and further preferably 150° C. or more, although it depends on the type of solid electrolyte.

The solid electrolyte may be of a proton type having a sulfuric acid as a substituent, or of a salt type having a salt of sulfuric acid as described in JP-A-2004-165096 and JP-A-2005-190702. The counter action of a salt type subtonic acid is preferably a mono- or divalent action, and more preferably a monovalent action. Specifically, lithium, sodium, potassium or magnesium is preferable. Further, plural types may be employed from the group consisting of these captions and a proton.

When the above-described salt is used, in addition, the following process is necessary.

In order to use it for a fuel cell, the solid electrolyte must have proton conductivity. For the purpose, by contacting the solid electrolyte with an acid, a salt substitution percentage thereof is reduced to 99% or less of that before the contact. Contact with an acid after joining the electrode catalyst and the polymer electrolyte film can recover lowering in moisture content and ion conductivity of the film caused by thermal history that is given during the electrode joining.

The contact with an acid can be carried out using a publicly known method, including dipping in an acidic aqueous solution such as hydrochloric acid, or spraying of an acidic aqueous solution. Concentration of an acidic aqueous solution to be used may depend on degree of lowering in the ion conductivity, dipping temperature, dipping time and the like and, for example, an acidic aqueous solution of 0.0001-5 N may be used suitably. As to the dipping temperature, room temperature often can achieve sufficient conversion, and, in order to shorten the dipping time, the acidic aqueous solution may be heated. Although the dipping time depends on the concentration of the acidic aqueous solution and dipping temperature, a range of around 10 minutes-48 hours is preferable.

Such method may be also employed that a proton moving in the inside of the film functions as an acid upon operating a fuel cell to wash out a substituted action, thereby allowing the film to exert a higher ion conductivity. A method for producing a fuel cell by using the MEA thus produced will be described.

A solid polymer electrolyte type fuel cell is constituted of an MEA, a current collector, a fuel cell frame, a gas-feeding apparatus and the like. Among them, the current collector (bipolar plate) has a combined function as a flow pass-forming member, which is made of graphite or metal provided with a gas flow pass on the surface or the like, and a current collector. The MEA may be inserted between such current collectors, a plurality of which are piled up to manufacture a fuel cell stack.

A higher operating temperature of a fuel cell is preferable, because catalyst activity enhances. But, ordinarily, it is operated at 50° C.-120° C., at which water content is easily controlled. Although a higher supply pressure of oxygen and hydrogen may be preferable because a fuel cell output increases, since probability of their contact through film breakage or the like also increases, the pressure is preferably controlled within a suitable range such as 1-3 atmospheric pressures.

Examples of material that can be used as the fuel for a fuel cell employing the solid electrolyte of the invention include, as anode fuel, hydrogen, alcohols (methanol, isopropanol, ethylene glycol etc.), ethers (dimethylether, dimethoxymethane, dimethoxymethane etc.), formic acid, boron hydride complexes, ascorbic acid and the like. As cathode fuel, oxygen (including oxygen in air), hydrogen peroxide and the like.

There are 2 ways to supply the aforementioned anode fuel and cathode fuel to respective catalyst layers, that is, (1) a method in which they are subjected to controlled circulation using an auxiliary machine such as a pump (active type), and (2) a method in which no auxiliary machine is used (passive type, in which, for example, liquid fuel is supplied by capillary action or free fall; and gas fuel is supplied by exposing a catalyst layer to air). Combination of these is also possible. The former has such advantage that a high output may be achieved by carrying out pressurized humidity conditioning of reaction gasses, but has such disadvantage that miniaturization is difficult. The latter has an advantage of possibility of miniaturization, but has a disadvantage of difficulty in generating a high output.

Generally, single cell voltage of a fuel cell is 1.2 V or less, therefore, single cells are used in series stacking in accordance with necessary voltage required from load. As to the stacking method, there are 2 usable methods, that is, "planar stacking" wherein single cells are aligned on a plane and "bipolar stacking" wherein single cells are stacked via a separator having fuel paths formed on both sides thereof. The former is suitable for a compact fuel cell, because the catholic pole (air pole) is exposed on the surface, thereby making it easy to take in air and possible to form a thin type stacking. In addition to these, a method is proposed in which, while applying MEMS technology, micro fabrication is given to a silicon wafer to form a stacking.

Various applications have been discussed about a fuel cell, including automobile use, household use and portable device use and the like. In particular, the hydrogen type fuel cell is expected as an energy source for various hot water-supplying and power generating apparatuses for home use, source of power for transport apparatuses, and an energy source for portable electronic devices, while utilizing the advantage of generating a high output. For example, the hot water-supplying and power generating apparatus to which it can be preferably applied includes home-use, collective housing-use and hospital-use apparatuses; the transport apparatus includes the automobile and marine vessel; and the portable device includes the cellular phone, mobile notebook computer and electronic still camera and the like. Examples of the suitably applicable portable device include a portable generator, outdoor lighting device and the like. In addition, it can preferably be used as a power source of a robot for industrial use or household use, or other toys and games. Furthermore, it is useful as a power source for charging a secondary battery mounted on these devices. In addition, an application as an emergency power source is also proposed.

EXAMPLES

The present invention will be described more specifically below based on Examples. The material, use amount, percentage, treatment content, treatment procedure and the like represented in Examples below can be arbitrarily changed as long as the change results in no deviation from the intent of the invention. Accordingly, the scope of the invention is not restricted to the specific examples represented below.

Example 1

Manufacture of a Solid Electrolyte

While using 2,2-bis(4-hydroxyphenyl)propane and bis(4-chlorophenylphenyl)sulfide as monomers, polysulfide was synthesized according to a general polymerization method described in "Jikken Kagaku Kouza (Experimental Chemistry Course)" ver. 4, vol. 28, Kobunshi Gousei (Polymer Synthesis) p 357 (Maruzen).

Synthesis of Polysulfone

To a 500 ml 3-necked flask provided with an agitator, a nitrogen-introducing tube and a Dean-Stark trap, 2,2-bis(4-hydroxyphenyl)propane (22.8 g, 0.1 mol), bis(4-chloroprene) sulfide (28.7 g, 0.1 mol), potassium carbonate (17.25 g, 0.125 mol), dimethylacetamide (DMAc) (150 ml), toluene (75 ml) were charged. The mixture was refluxed for 6 hours under nitrogen atmosphere, and then surplus toluene was removed by reducing pressure. The reaction mixture was then heated at 160° C. for 10-12 hours. The resulting viscous solution was cooled to 100° C., to which chlorobenzene (75 ml) was added, followed by filtering a by-produced inorganic salt with a glass filter. The filtrate was neutralized with acetic acid, from which polymer was precipitated using water-methanol (250 ml, 1:1) to the solution (25 ml). The obtained polymer was filtered, which was sufficiently washed with water, methanol and water in this order, and then refluxed with boiling water for 1 hour in order to remove the salt remaining in the polymer. The polymer was filtrated, and subjected to reduced-pressure drying (100° C.) to give polysulfide, that is, the targeted polymer.

As the result of $^1$H-NMR (chloroform-d solvent) measurement, there were observed a peak based on a methyl group in the main chain polysulfide at $\delta$1.7 PPm (s), and a peak based on an aromatic ring in the main chain at $\delta$6.8-8.1 ppm (m).

Chloromethylation 18.75 ml ($2.49 \times 10^{-1}$ mol) of chloromethylmethyl ether ($ClCH_2OCH_3$), to which 0.15 ml ($1.25 \times 10^{-3}$ mol) of $SnCl_4$ had been added, was added to a solution prepared by dissolving (at about 60° C.) 11 g ($3.9 \times 10^{-4}$ mol) of polysulfide in 200 ml of 1,1,2,2-tetrachloroethane. The solution was put in a 500 ml 3-necked flask, to which a water-cooled tube was attached, the solution was then stirred at 110° C. for 3 hours under nitrogen substitution to be reacted.

Then, 3 ml of methanol (MeOH) was added to stop the reaction, and the solution was left to be cooled to around room temperature. The solution was then moved to a beaker, to which 400 ml of MeOH was added to precipitate a polymer, and suction filtration was carried out to separate the precipitate from filtrate. To the precipitate, 200 ml of MeOH was added again to precipitate a polymer, which was subjected to suction filtration to separate the precipitate from the filtrate. The precipitate was vacuum-dried to give 9.3 g of chloromethylated polysulfide, that is, the target.

As the result of $^1$H-NMR (chloroform-d solvent) measurement, there were observed a peak based on a methyl group in the main chain polysulfide at δ1.7 ppm (s), a peak based on a ethylene group bonding to an aromatic ring in the main chain at δ4.55 ppm (s), and a peak based on an aromatic ring in the main chain at δ6.8-8.1 ppm (m). In addition, from a integrated value of H according to the $^1$H-NMR measurement, number of the chloromethyl group per the structure repeating unit of chloromethylated polysulfide was about 1.0.

Suffocation

In a 500 ml 3-necked flask, 4.6 g ($4.1 \times 10^{-2}$ mol) of potassium-tert-butoxide (($CH_3$)$_3$COK)) and 6.6 g ($3.7 \times 10^{-2}$ mol) of sodium 3-Mercator-1-propane suffocate (HS—($CH_2$)$_3$—$SO_3$Na) were charged, to which 100 ml of dewatered dimethylformamide (DMF) was added. The solution was stirred at 80° C. for 10 minutes under nitrogen flow.

A solution prepared by dissolving 5 g of chloromethylated polysulfide synthesized above in 100 ml of dewatered DMF was added to the 3-necked flask containing the solution prepared above using a dropping funnel. A water-cooled tube was attached to the flask, the content of which was stirred at 80° C. for 5 hours under nitrogen flow to allow it to react. Then, heating was stopped, the flask was pulled up from an oil bath and left to cool to around room temperature. Then, the resultant was subjected to suction filtration to separate the precipitate from the filtrate. To the precipitate was added 200 ml of distilled water, which was stirred at room temperature for 2 hours. Then, suction filtration was carried out to separate the precipitate from the filtrate. The precipitate was dried to give 4.8 g of a polymer having been introduced with a sulfuric acid group, that is, the target.

As the result of $^1$H-NMR (DMSO-d6 solvent) measurement, there were observed a peak based on a methyl group in the main chain polysulfide at δ1.65 ppm (s), a peak based on the central ethylene group of an alkaline group at δ1.8 ppm (m), peaks based on a thinly group in an alkaline group and a ethylene group adjacent to a sulfuric acid group at δ2.4 ppm (m) and δ2.6 ppm (m), a peak based on a ethylene group between a throatier group and an aromatic ring in the main chain at δ3.6 ppm (s), and a peak based on an aromatic ring in the main chain at δ6.8-8.1 ppm (m). In addition, from a integrated value of H according to the $^1$H-NMR measurement (DMSO-d6 solvent), number of the mercaptopropane sulfuric acid group per the structure repeating unit of the polymer having been introduced with a sulfuric acid group was about 1.0.

The weight-average molecular weight (Mw) obtained from GPC (gas permeation chromatography) measurement (measurement solvent: N,N-dimethylformamide) was 185,000 (in terms of polystyrene), and molecular weight distribution (Mw/Mn) was 5.7. Here, the molecular weight distribution (Mw/Mn) is represented by a value obtained by dividing the weight-average molecular weight (Mw) by the number-average molecular weight (Mn).

Film-Forming

About 5 g of the obtained polymer was dissolved in 40 ml of DMF to prepare a dope liquid. The dope liquid was poured on a glass plate and expanded using a bar coater. Then, it was dried at 65° C. for 15 hours. The film was then stripped from the glass plate, dipped in 1 mol/l HCl overnight to carry out salt exchange to give a suffocated polysulfide film (solid electrolyte film).

Tg (Glass Transition Temperature) and Storage Elastic Modulus

The Tg (glass transition temperature) and storage elastic modulus of the film obtained above were measured. The above-described solid electrolyte film was cut out to length of 5 cm and width of 1 cm, which was subjected to DMA (viscoelastic analysis) (frequency: 10 Hz). The results are listed in Table 1.

Oxygen Permeability Test

The oxygen permeability of the film obtained above was measured. The above-described solid electrolyte film was cut out to length of 3 cm and width of 3 cm, which was subjected to measurement using an oxygen permeability measurement apparatus (Illinois Model 8000) at 75° C. The measurement result is listed in Table 1.

Ion Conductivity

The ion conductivity of the obtained film was measured according to Journal of the Electrochemical Society vol. 143, No. 4, PP 1254-1259 (1996). The above-described solid electrolyte film was cut out to length of 2 cm and width of 1 cm, which was inserted in a conductivity cell described in Journal of Membrane Science vol. 219, pp 123-136 (2003). Then, the measurement was carried out, while using a combination of Model 1480 and Model 1255B manufactured by Solartron as an impedance analyzer, by an alternating-current impedance method at 80° in water. The ion conductivity was calculated according to the following formula 1.

Ion conductivity—(Distance between Measuring Terminals)/(Resistance×Film Thickness×Film Width) The obtained result is listed in Table 2.

It was recognized that the solid electrolyte film of the invention has a high ion conductivity. Such solid electrolyte film can be preferably used, for example, as a proton exchange film of a fuel cell.

Manufacture of a Fuel Cell (1) Manufacture of a Catalyst Film 2 g of platinum-carrying carbon (50% by mass of platinum was carried on Vulcan XC72) and 15 g of Nafion® solution (5% alcoholic aqueous solution) were mixed, which was dispersed with an ultrasonic dispersion apparatus for 30 minutes. The obtained dispersion liquid was coated on a polytetrafluoroethylene film (thickness: 200 μm) and dried. The film was punched out to a predetermined size to manufacture a catalyst film.

(2) Manufacture of MEA

To both sides of the solid electrolyte film having been not subjected to salt exchange manufactured above, the catalyst film obtained above was laminated so that the coated surface contacted with the solid electrolyte film, which was thermal compression-bonded at 125° C. and 3 MPa for 2 minutes to manufacture an MEA in sequence.

After that, in order to convert sodium suffocate of the solid electrolyte film of the MEA into acid type sulfuric acid, the MEA was dipped in 1 N hydrochloric acid overnight, then washed, dipped in water for 4 hours and dried to be used.

(3) Fuel Cell Characteristics

On the MEA obtained in (2), a gas diffusion electrode manufactured by E-TEK was stacked, which was set to a standard fuel cell test cell manufactured by Electrochem Company. Then, hydrogen gas was flown to the anode side and air was flown to the cathode side. Between the anode electrode 12 and the cathode electrode 13, a constant current of 800 mA/cm$^2$ was galvanized with a galvanostat to measure a cell voltage at that time. The result is listed in Table 2.

(Result)

As shown in Table 1 described later, it was recognized that a high voltage can be maintained by using the solid electrolyte of the invention.

Example 2

Manufacture of Fuel Cell (1) Manufacture of Catalyst Film 2 g of a platinum-carrying carbon (50% by mass of platinum is carried on Vulcan XC72) and 15 g of a solution (5% DMF solution) of the polymer synthesized in Example 1 were mixed and dispersed with an ultrasonic dispersing apparatus for 30 minutes. The obtained dispersed liquid was coated on polytetrafluoroethylene film (thickness: 200 μm) and dried. The film was then punched out into a predetermined size to manufacture a catalyst film.

(2) Manufacture of MEA

To both sides of the solid electrolyte film having been not subjected to salt exchange manufactured in Example 1, the catalyst film obtained above was laminated so that the coated surface contacted with the solid electrolyte film, which was thermal compression-bonded at 190° C. and 3 MPa for 2 minutes to manufacture an MEA in sequence.

After that, in order to convert sodium suffocate of the solid electrolyte film of the MEA into acid type sulfuric acid, the MEA was dipped in 1 N hydrochloric acid overnight, then washed, dipped in water for 4 hours and dried to be used.

(3) Fuel Cell Characteristics

On the MEA obtained in (2), a gas diffusion electrode manufactured by E-TEK was stacked, which was set to a standard fuel cell test cell manufactured by Electrochem Company. Then, hydrogen gas was flown to the anode side and air was flown to the cathode side. Between anode electrode 12 and cathode electrode 13, a constant current of 800 mA/cm$^2$ was galvanized with a galvanostat to measure a cell voltage at that time. The result is listed in Table 2.

(Result)

It was recognized that a higher voltage can be maintained by replacing, as a binder coating solution, a Nafion® solution (Example 1) with a solution of the polymer synthesized in Example 1.

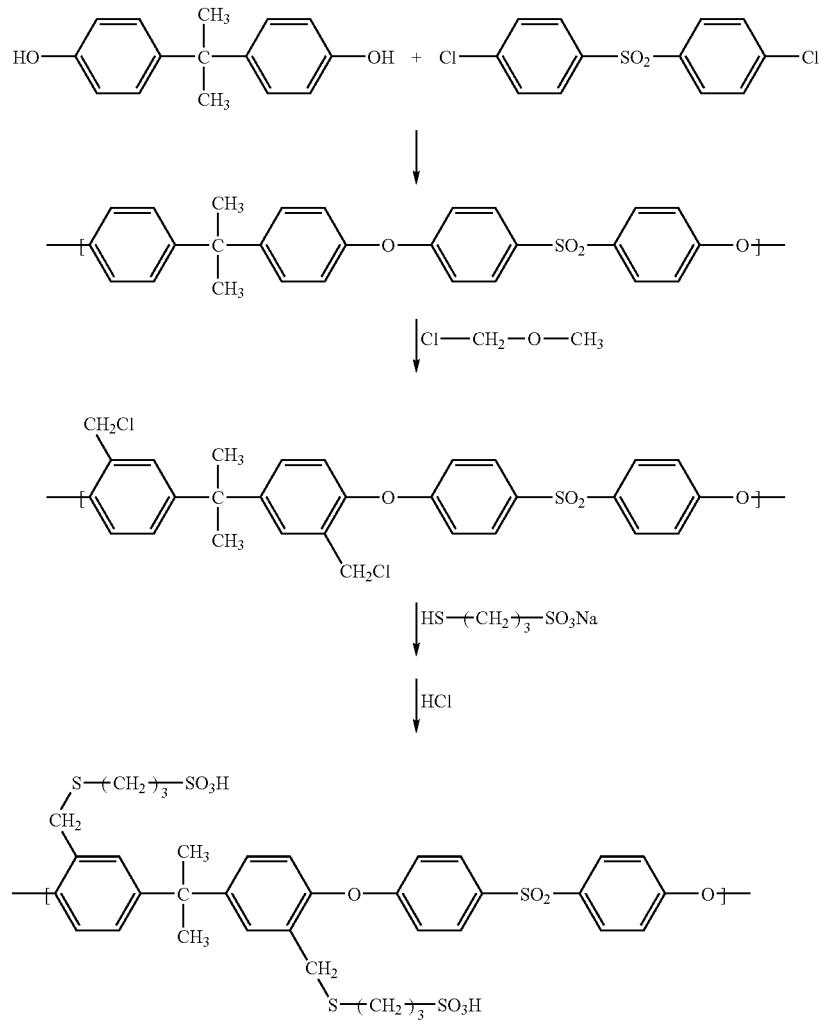

Example 3

Manufacture of Solid Electrolyte

Polysulfone was synthesized in the same way as in Example 1, which was then chloromethylated to give 9.3 g of chloromethylated polysulfide.

Suffocation

In a 500 ml 3-necked flask, 4.6 g ($4.1 \times 10^{-2}$ mol) of potassium-tert-butoxide (($CH_3$)$_3$COK)) and 6.1 g ($3.7 \times 10^{-2}$ mol) of sodium 2-mercaptoethane suffocate (HS—($CH_2$)$_2$—$SO_3$Na) were charged, to which 100 ml of dewatered DMF was added. The solution was stirred at 80° C. for 10 minutes under nitrogen flow.

A solution prepared by dissolving 5 g of chloromethylated polysulfide synthesized above in 100 ml of dewatered DMF was added to the 3-necked flask containing the solution prepared above using a dropping funnel. A water-cooled tube was attached to the flask, the content of which was stirred at 80° C. for 5 hours under nitrogen flow to allow it to react. Then, heating was stopped, the flask was pulled up from an oil bath and left to cool to around room temperature. Then, the resultant was subjected to suction filtration to separate the precipitate from the filtrate. To the precipitate was added 200 ml of distilled water, which was stirred at room temperature for 2 hours. Then, suction filtration was carried out to separate the precipitate from the filtrate. The precipitate was dried to give 4.7 g of a polymer having been introduced with a sulfuric acid group, that is, the target.

An NMR measurement was carried out in order to check the degree of suffocation of the polymer to reveal that sodium mercaptethane suffocate bonded to one repeating structural unit of the polymer at a ratio of about 1.

As the result of $^1$H-NMR (DMSO-d6 solvent) measurement, there were observed a peak based on a methyl group in the main chain polysulfide at δ1.65 ppm (s), peaks based on a thiol group in an alkaline group and a ethylene group adjacent to the sulfuric acid group at δ2.4 ppm(m) and δ2.6 ppm (m), a peak based on a ethylene group between a throatier group and an aromatic ring in the main chain at δ3.6 ppm (s), and a peak based on an aromatic ring in the main chain at δ6.8-8.1 ppm (m). In addition, from a integrated value of H according to the $^1$H-NMR measurement (DMSO-d6 solvent), number of the mercaptoethane sulfuric acid group per the structure repeating unit of the polymer having been introduced with a sulfuric acid group was about 1.0.

The weight-average molecular weight (Mw) obtained from GPC measurement (N,N-dimethylformamide) was 179,000 (in terms of polystyrene), and molecular weight distribution (Mw/Mn) was 5.6. Here, the molecular weight distribution (Mw/Mn) is represented by a value obtained by dividing the weight-average molecular weight (Mw) by the number-average molecular weight (Mn).

Film-Forming

About 5 g of the obtained polymer was film-formed in the same way as in Example 1 to give a suffocated polysulfide film (solid electrolyte film).

Tg (Glass Transition Temperature) and Storage Elastic Modulus

The Tg (glass transition temperature) and storage elastic modulus of the film obtained above were measured in the same way as in Example 1. The results are listed in Table 1.

Oxygen Permeability Test

The oxygen permeability of the film obtained above was measured in the same way as in Example 1. The measurement result is listed in Table 1.

Ion Conductivity

The obtained solid electrolyte film was measured in the same way as in Example 1 and the ion conductivity was calculated according to the Formula 1. The obtained result is listed in Table 2.

It was recognized that the solid electrolyte film of the invention has a high ion conductivity. Such solid electrolyte film can be preferably utilized, for example, as a proton exchange film of a fuel cell.

Manufacture of Fuel Cell (1) Manufacture of Catalyst Film 2 g of a platinum-carrying carbon (50% by mass of platinum is carried on Vulcan XC72) and 15 g of a Nafion® solution (5% alcoholic aqueous solution) were used to manufacture a catalyst film in the same way as in Example 1.

(2) Manufacture of MEA

To both sides of the solid electrolyte film having been not subjected to salt exchange manufactured above, the catalyst film obtained above was laminated so that the coated surface contacted with the solid electrolyte film, which was thermal compression-bonded at 125° C. and 3 MPa for 2 minutes to manufacture an MEA in sequence.

After that, in order to convert sodium suffocate of the solid electrolyte film of the MEA into acid type sulfuric acid, the MEA was dipped in 1 N hydrochloric acid overnight, then washed, dipped in water for 4 hours and dried to be used.

(3) Fuel Cell Characteristics

On the MEA obtained in (2), a gas diffusion electrode manufactured by E-TEK was stacked, which was set to a standard fuel cell test cell manufactured by Electrochem Company. Then, hydrogen gas was flown to the anode side and air was flown to the cathode side. Between the anode electrode 12 and the cathode electrode 13, a constant current of 800 mA/cm$^2$ was galvanized with a galvanostat to measure a cell voltage at that time. The result is listed in Table 2.

(Result)

As shown in Table 1 described later, it was recognized that a high voltage can be maintained by using the solid electrolyte of the invention.

Example 4

Manufacture of Fuel Cell (1) Manufacture of Catalyst Film 2 g of a platinum-carrying carbon (50% by mass of platinum was carried on Vulcan XC72) and 15 g of a solution (5% DMF solution) of the polymer synthesized in Example 3 were mixed and dispersed with an ultrasonic dispersing apparatus for 30 minutes. The obtained dispersed liquid was coated on polytetrafluoroethylene film (thickness: 200 μm) and dried. The film was then punched out into a predetermined size to manufacture a catalyst film.

(2) Manufacture of MEA

To both sides of the solid electrolyte film having been not subjected to ion exchange manufactured in Example 1, the catalyst film obtained above was laminated so that the coated surface contacted with the solid electrolyte film, which was thermal compression-bonded at 180° C. and 3 MPa for 2 minutes to manufacture an MEA in sequence.

After that, in order to convert sodium suffocate of the solid electrolyte film of the MEA into acid type sulfuric acid, the MEA was dipped in 1 N hydrochloric acid overnight, then washed, dipped in water for 4 hours and dried to be used.

(3) Fuel Cell Characteristics

On the MEA obtained in (2), a gas diffusion electrode manufactured by E-TEK was stacked, which was set to a standard fuel cell test cell manufactured by Electrochem Company. Then, hydrogen gas was flown to the anode side and air was flown to the cathode side. Between the anode electrode 12 and the cathode electrode 13, a constant current of 800 mA/cm² was galvanized with a galvanostat to measure a cell voltage at that time. The result is listed in Table 2.

(Result)

It was recognized that a higher voltage can be maintained by replacing, as a binder coating solution, a Nafion® solution (Example 3) with a solution of the polymer synthesized in Example 3.

Comparative Example 1

Suffocated Polysulfone

Polysulfone (reagent of Aldrich Company) was suffocated with concentrated sulfuric acid to give a polymer having been introduced with a sulfuric acid group in a biphenyl unit. The obtained suffocated polymer was film-formed by a cast method in the same way as in Example 1 to give a suffocated polysulfide film (solid electrolyte film).

Tg (Glass Transition Temperature) and Storage Elastic Modulus

The Tg (glass transition temperature) and storage elastic modulus of the film obtained above were measured in the same way as in Example 1. The result is listed in Table 1.

Oxygen Permeability Test

The oxygen permeability of the film obtained above was measured in the same way as in Example 1. The measurement result is listed in Table 1.

Ion Conductivity

The obtained solid electrolyte film was measured in the same way as in Example 1 and the ion conductivity was calculated according to the Formula 1. The obtained result is listed in Table 2.

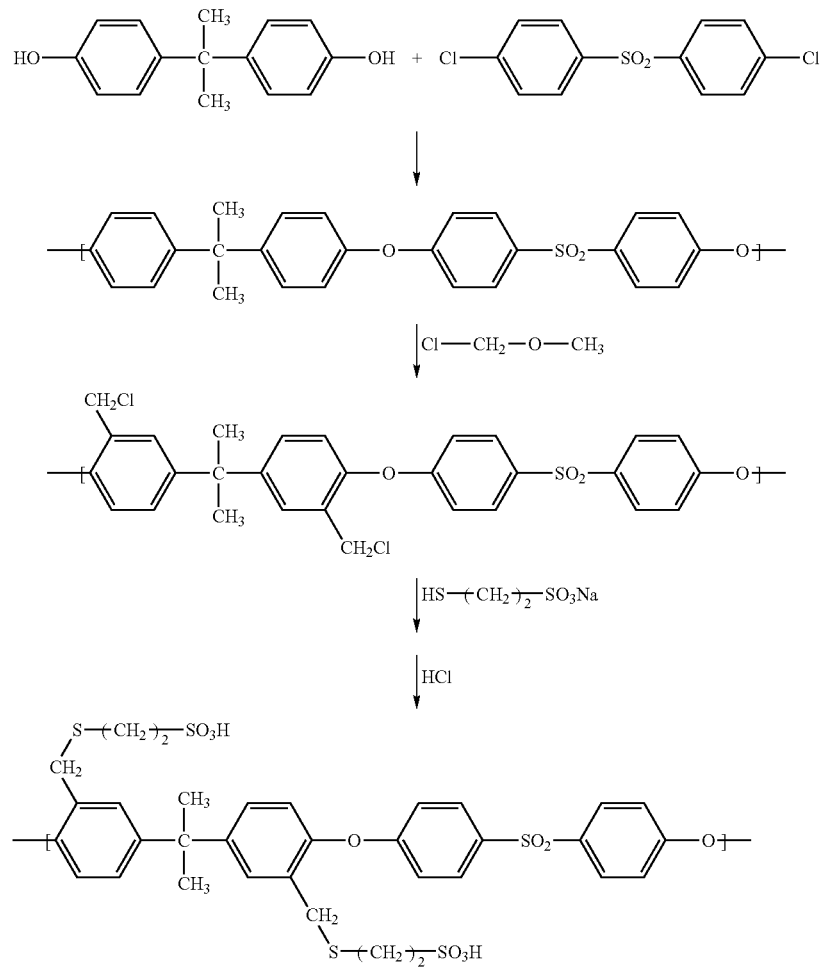

Fuel Cell Characteristics

A catalyst film and an MEA were manufactured as in Example 1 to measure cell voltage in the same way as in Example 1. The result is listed in Table 2.

Comparative Example 2

Tg (Glass Transition Temperature) and Storage Elastic Modulus

The Tg (glass transition temperature) and storage elastic modulus of a per fluorocarbon sulfuric acid film (Nation 1135® film) were measured in the same way as in Example 1. The result is listed in Table 1.

Oxygen Permeability Test

The oxygen permeability of the film obtained above was measured in the same way as in Example 1. The measurement result is listed in Table 1.

Ion Conductivity

The obtained solid electrolyte film was measured in the same way as in Example 1 and the ion conductivity was calculated according to the Formula 1. The obtained result is listed in Table 2.

Fuel Cell Characteristics

A catalyst film and an MEA were manufactured in the same way as in Example 1 to measure cell voltage. The result is listed in Table 2.

TABLE 1

| | Tg (° C.) | Storage Elastic Modulus (GPa) | Oxygen Permeability (mol/cm · sec) |
|---|---|---|---|
| Example 1 | 199 | 1.9 | $1.49 \times 10^{-11}$ |
| Example 3 | 203 | 1.9 | $1.42 \times 10^{-11}$ |
| Comparative Example 1 | 207 | 1.9 | $3.44 \times 10^{-12}$ |
| Comparative Example 2 | 117 | 0.4 | $1.02 \times 10^{-11}$ |

TABLE 2

| | Proton Conductivity (S/cm) | Cell Voltage (V) |
|---|---|---|
| Example 1 | 0.23 | 0.65 |
| Example 2 | 0.23 | 0.71 |
| Example 3 | 0.24 | 0.66 |
| Example 4 | 0.24 | 0.73 |
| Comparative Example 1 | 0.16 | 0.51 |
| Comparative Example 2 | 0.17 | 0.52 |

It was recognized that the solid electrolyte film of the invention has a high ion conductivity, and that use of the solid electrolyte film as a binder results in a higher cell voltage. The solid electrolyte can be preferably utilized as a proton exchange film and a binder of a fuel cell.

The present disclosure relates to the subject matter contained in Japanese Patent Application No. 141503/2005 filed on May 13, 2005 and Japanese Patent Application No. 015972/2006 filed on Jan. 25, 2006, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A solid electrolyte having an aromatic ring in a main chain, wherein a sulfonic acid group bonds to the aromatic ring via a linking group containing a sulfur atom.

2. The solid electrolyte according to claim 1, wherein the sulfuric acid group boding to the aromatic ring via the linking group containing a sulfur atom is represented by the following formula (1) below:

Formula (1)

wherein $B^1$ and $B^2$ each independently represents a linking group, X represents a group containing a sulfur atom, M represents a action, and m1 represents an integer of 1 or more.

3. The solid electrolyte according to claim 2, wherein the X is S, SO or $SO_2$.

4. The solid electrolyte according to claim 2, wherein the m1 in the formula (1) is an integer of 1-6.

5. The solid electrolyte according to claim 2, wherein the $B^1$ and $B^2$ in the formula (1) is each independently a linking group having 0-100 carbon atoms selected from the group consisting of an alkaline group, an arlene group, an alkenylene group, an alkynylene group, an amide group, an ester group, a sulfonamide group, a sulfuric acid ester group, an redo group, a sulfonylurea group, a slimly group, a throatier group, an ether group, a carbonyl group, a heteryllene group, and a group constituted by combining 2 or more of these.

6. The solid electrolyte according to claim 2, wherein the main chain comprises at least one type of repeating unit represented by the formula (2) below and a group represented by the above-described formula (1) bonds to an aromatic ring contained in the main chain:

Formula (2)

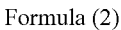

wherein $R^1$ represents any one of structures represented by formulae (6)-(25) below:

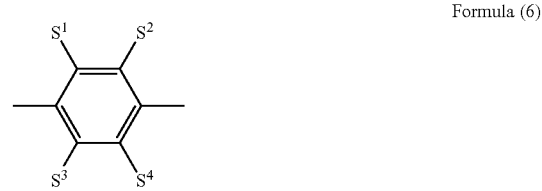

Formula (6)

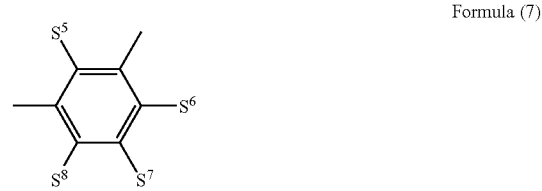

Formula (7)

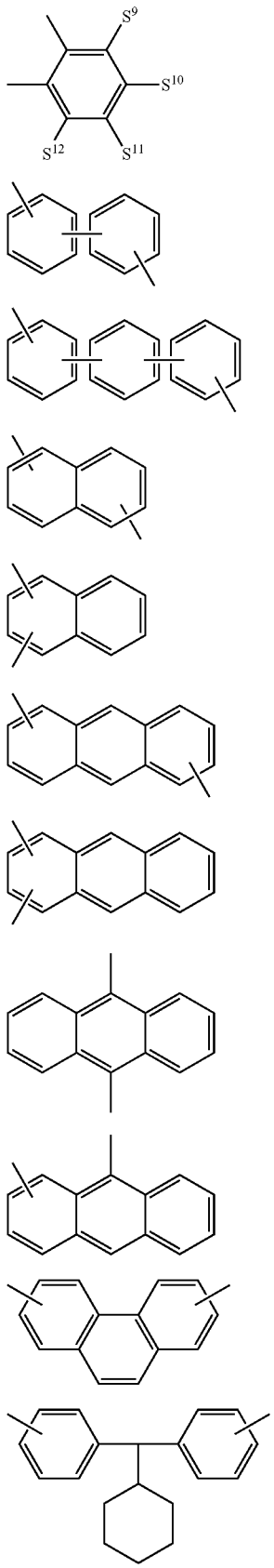
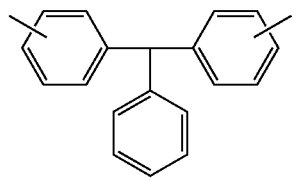
Formula (19)
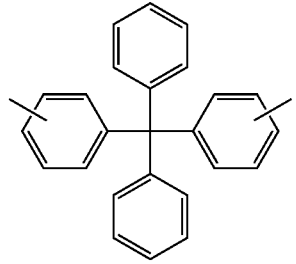
Formula (20)
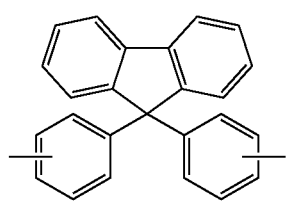
Formula (21)
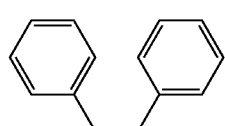
Formula (22)
Formula (23)
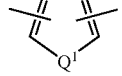
Formula (24)
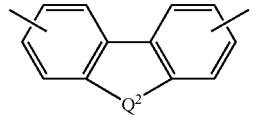
Formula (25)
wherein $S^1$-$S^{12}$ in formulae (6)-(8) each independently represents a hydrogen atom or a substitution group; $Q^1$ in the formula (24) represents —O— or —S—; and $Q^2$ in the formula (25) represents —O—, —CH$_2$—, —CO— or —$NH_2$—; X represents a single bond, —$C(R^5R^6)$—, —O—, —S—, —CO—, —SO— —$SO_2$—, or a combination of 2 or more of these, wherein $R^5$ and $R^6$ each independently represents a hydrogen atom, an alkyl group, an alchemy group, an aryl group or a halogen-substituted alkyl group.

7. The solid electrolyte according to claim 1, wherein the solid electrolyte is in the form of a film.

8. A film for a fuel cell comprising the solid electrolyte as described in claim 7 and a gas diffusion electrode consisting of a cathode electrode and an anode electrode sandwiching the solid electrolyte there between.

9. The film for a fuel cell according to claim 8, wherein the gas diffusion electrode is an electrode in which a fine particle of catalyst metal is carried on the surface of a conductive material comprising a carbon material by a binder.

10. The film for a fuel cell according to claim 9, wherein the binder comprises the solid electrolyte having an aromatic ring in a main chain, wherein a sulfuric acid group bonds to the aromatic ring via a linking group containing a sulfur atom.

11. A membrane and electrode assembly comprising the solid electrolyte as described in claim 7 and a gas diffusion electrode consisting of a cathode electrode and an anode electrode sandwiching the solid electrolyte there between.

12. The membrane and electrode assembly according to claim 11, wherein the gas diffusion electrode is an electrode in which a fine particle of catalyst metal is carried on the surface of a conductive material comprising a carbon material by a binder.

13. The membrane and electrode assembly according to claim 12, wherein the binder comprises the solid electrolyte having an aromatic ring in a main chain, wherein a sulfuric acid group bonds to the aromatic ring via a linking group containing a sulfur atom.

14. A fuel cell comprising the film for a fuel cell as described in claim 8.

15. The fuel cell according to claim 14 further comprising a pair of gas-impermeable separators that are arranged so as to sandwich the gas diffusion electrode.

16. The fuel cell according to claim 15 further comprising a pair of current collectors arranged between the solid electrolyte and the separator.

17. A method for producing the solid electrolyte as described in claim 3, comprising reacting a monomer containing at least 1 suffocate group and at least 2 releasable groups with a co monomer containing at least 2 releasable groups to form a suffocated polymer and removing the releasable group by condensation of the monomer and the comonomer through the reaction.

18. A method for producing the solid electrolyte as described in claim 3, comprising introducing a halogenomethyl group into an aromatic ring of an aromatic ring-containing polymer, and reacting the aromatic ring-containing polymer with a compound having a group containing a suffocate group and a sulfur atom.

* * * * *